US012283693B2

(12) United States Patent
Yoshikawa et al.

(10) Patent No.: US 12,283,693 B2
(45) Date of Patent: Apr. 22, 2025

(54) POSITIVE ELECTRODE FOR NON-AQUEOUS ELECTROLYTE SECONDARY BATTERY, AND NON-AQUEOUS ELECTROLYTE SECONDARY BATTERY, BATTERY MODULE AND BATTERY SYSTEM USING THE SAME

(71) Applicant: SEKISUI CHEMICAL CO., LTD., Osaka (JP)

(72) Inventors: Hikaru Yoshikawa, Tsukuba (JP); Yuichi Sabi, Tsukuba (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 319 days.

(21) Appl. No.: 17/768,968

(22) PCT Filed: Mar. 18, 2022

(86) PCT No.: PCT/JP2022/012903
§ 371 (c)(1),
(2) Date: Apr. 14, 2022

(87) PCT Pub. No.: WO2022/196829
PCT Pub. Date: Sep. 22, 2022

(65) Prior Publication Data
US 2022/0352514 A1 Nov. 3, 2022

(30) Foreign Application Priority Data

Mar. 19, 2021 (JP) .................................. 2021-045977
Aug. 18, 2021 (JP) .................................. 2021-133388
Aug. 18, 2021 (JP) .................................. 2021-133447

(51) Int. Cl.
*H01M 4/525* (2010.01)
*H01M 4/36* (2006.01)
(Continued)

(52) U.S. Cl.
CPC ........... *H01M 4/525* (2013.01); *H01M 4/366* (2013.01); *H01M 4/505* (2013.01); *H01M 4/625* (2013.01);
(Continued)

(58) Field of Classification Search
None
See application file for complete search history.

(56) References Cited

U.S. PATENT DOCUMENTS

2013/0095385 A1   4/2013   Tran et al.
2014/0120423 A1   5/2014   Matsuo et al.
(Continued)

FOREIGN PATENT DOCUMENTS

CN   101771148   7/2010
CN   103329318   9/2013
(Continued)

OTHER PUBLICATIONS

Katja Kretschmer, Bing Sun, Xiuqiang Xie, Shuangqiang Chen, Guoxiu Wang. A free-standing LiFePO4-carbon paper hybrid cathode for flexible lithium-ion batteries, Green Chem., 2016, 18, 2691.*

(Continued)

*Primary Examiner* — Carlos Barcena
(74) *Attorney, Agent, or Firm* — Wenderoth, Lind & Ponack, L.L.P.

(57) ABSTRACT

A positive electrode (1) for non-aqueous electrolyte secondary batteries, including a collector (11) and an active material layer (12), wherein a spreading resistance distribution of the layer (12) shows a profile with a sum of frequencies of resistance values 4.0 to 6.0 (log Ω) accounting for 0.0 to 5.0% relative to a total, 100%, of frequencies of resistance values 4.0 to 12.5 (log Ω). A positive electrode (1) for non-aqueous electrolyte secondary batteries, including a (Continued)

collector (11) and an active material layer (12), wherein the layer (12) includes an active material and a conductive carbon material, and an amount of a low-resistance conductive carbon material having a resistivity of 0.10 Ω·cm or less is 0.5% by mass or less, based on a total mass of the layer (12). A positive electrode (1) for non-aqueous electrolyte secondary batteries, including a collector (11) and an active material layer (12), wherein the active material has a coated section including a conductive material, and the layer (12) has a powder resistivity of 10 to 1,000 Ω·cm.

11 Claims, 6 Drawing Sheets

(51) Int. Cl.
  *H01M 4/505* (2010.01)
  *H01M 4/62* (2006.01)
  *H01M 10/0525* (2010.01)
  *H01M 4/02* (2006.01)

(52) U.S. Cl.
  CPC .. *H01M 10/0525* (2013.01); *H01M 2004/028* (2013.01)

(56) References Cited

U.S. PATENT DOCUMENTS

| | | | | |
|---|---|---|---|---|
| 2016/0049657 | A1* | 2/2016 | Forbert | C01B 25/45 252/182.1 |
| 2017/0162865 | A1 | 6/2017 | Páez Dueñas et al. | |
| 2018/0366727 | A1 | 12/2018 | Toyama et al. | |
| 2020/0020980 | A1* | 1/2020 | Tian | H01M 10/0569 |
| 2020/0075937 | A1 | 3/2020 | Konishi et al. | |
| 2020/0373559 | A1 | 11/2020 | Baek et al. | |
| 2021/0020907 | A1 | 1/2021 | Kim et al. | |
| 2021/0143440 | A1* | 5/2021 | Liu | H01M 10/0569 |

FOREIGN PATENT DOCUMENTS

| | | |
|---|---|---|
| CN | 107946566 | 4/2018 |
| CN | 111211323 | 5/2020 |
| EP | 2 778 127 | 9/2014 |
| JP | 2003-142097 | 5/2003 |
| JP | 2006-107750 | 4/2006 |
| JP | 2007-173134 | 7/2007 |
| JP | 2012-529726 | 11/2012 |
| JP | 2013-30292 | 2/2013 |
| JP | 2013-525964 | 6/2013 |
| JP | 2013-187034 | 9/2013 |
| JP | 2014-17199 | 1/2014 |
| JP | 2015-527707 | 9/2015 |
| JP | 2016-81801 | 5/2016 |
| JP | 2016-149276 | 8/2016 |
| JP | 2017-63013 | 3/2017 |
| JP | 2017-91859 | 5/2017 |
| JP | 2018-041710 | 3/2018 |
| JP | 2018-109577 | 7/2018 |
| JP | 2018-163871 | 10/2018 |
| JP | 2020-11872 | 1/2020 |
| JP | 2020-74261 | 5/2020 |
| JP | 2020-518989 | 6/2020 |
| JP | 2020-155223 | 9/2020 |
| JP | 2021-508162 | 2/2021 |
| JP | 2021-517352 | 7/2021 |
| JP | 2022-18845 | 1/2022 |
| KP | 10-2020-0061723 | 6/2020 |
| WO | 2010/144222 | 12/2010 |
| WO | 2013/005739 | 1/2013 |
| WO | 2014/015139 | 1/2014 |
| WO | 2017/038628 | 3/2017 |
| WO | 2017/195332 | 11/2017 |
| WO | 2017/208894 | 12/2017 |
| WO | 2018/168059 | 9/2018 |
| WO | 2018/208660 | 11/2018 |

OTHER PUBLICATIONS

Boqiao Li, Wei Zhao, Chen Zhang, Zhe Yang, Fei Dang, YiLun Liu, Feng Jin , Xi Chen. Monodispersed LiFePO4@C Core-Shell Nanoparticles Anchored on 3D Carbon Cloth for High-Rate Performance Binder-Free Lithium Ion Battery Cathode, Hindawi Journal of Nanomaterials, vol. 2020, Article ID 2607017, 11 pages.*
International Search Report issued Sep. 16, 2022 in corresponding International (PCT) Patent Application No. PCT/JP2022/012903.
Decision of Refusal issued Jun. 7, 2022 in Japanese Patent Application No. 2021-197207, with English language translation.
Decision to Grant issued Oct. 25, 2022 in Japanese Patent Application No. 2021-197207, with English language translation.
Office Action issued Feb. 18, 2023 in corresponding Chinese Patent Application No. 202280000735.7, with English language translation.
Notice of Reasons for Rejection issued Feb. 1, 2022 in Japanese Patent Application No. 2021-197106, with English language translation.
Notice of Reasons for Rejection issued Feb. 22, 2022 in Japanese Patent Application No. 2021-197207, with English language translation.
Notice of Reasons for Rejection issued Feb. 15, 2022 in Japanese Patent Application No. 2021-197238, with English language translation.
Notice of Reasons for Rejection issued May 10, 2022 in Japanese Patent Application No. 2021-197238, with English language translation.
Extended European Search Report issued Mar. 23, 2023 in European Patent Application No. 22213149.2.

* cited by examiner

POSITIVE ELECTRODE FOR NON-AQUEOUS ELECTROLYTE SECONDARY BATTERY, AND NON-AQUEOUS ELECTROLYTE SECONDARY BATTERY, BATTERY MODULE AND BATTERY SYSTEM USING THE SAME

TECHNICAL FIELD

The present invention relates to a positive electrode for non-aqueous electrolyte secondary battery, as well as a non-aqueous electrolyte secondary battery, a battery module, and a battery system, each using the positive electrode.

Priorities are claimed on Japanese Patent Application No. 2021-045977, filed Mar. 19, 2021, Japanese Patent Application No. 2021-133388, filed Aug. 18, 2021, and Japanese Patent Application No. 2021-133447, filed Aug. 18, 2021, the contents of which are incorporated herein by reference.

BACKGROUND ART

A non-aqueous electrolyte secondary battery is generally composed of a positive electrode, a non-aqueous electrolyte, a negative electrode, and a separation membrane (separator) installed between the positive electrode and the negative electrode.

A conventionally known positive electrode for a non-aqueous electrolyte secondary battery is formed by fixing a composition composed of a positive electrode active material containing lithium ions, a conducting agent, and a binder to the surface of a metal foil (current collector). Examples of the practically used positive electrode active material containing lithium ions include lithium transition metal composite oxides such as lithium cobalt oxide ($LiCoO_2$), lithium nickel oxide ($LiNiO_2$), and lithium manganese oxide ($LiMn_2O_4$), and lithium phosphate compounds such as lithium iron phosphate ($LiFePO_4$).

PTL1 focuses on the spreading resistance of the secondary particles of the positive electrode active material as an index for evaluating the performance of the positive electrode active material, and describes examples where the compositions and manufacturing conditions for the positive electrode active materials are varied so as to produce the positive electrode active materials that differ in in the spreading resistance. The examples of PTL1 describe a secondary battery containing 6% by mass of acetylene black as a conducting agent.

PTL 2 describes examples where the output performance and energy density of a secondary battery are improved by using graphene flakes as a conducting agent. The examples using the graphene flakes show that the aspect ratio of a region below the specific resistance when the positive electrode cross section is mapped based on the spreading resistance values is larger than the comparative examples using powdery conducting agents.

PTL3 describes an example of a positive electrode having a positive electrode active material layer composed of 100 parts by mass of a positive electrode active material containing lithium ions, 5 parts by mass of a conducting agent, 5 parts by mass of a binder, and 1 part by mass of a thickener, which is provided on a current collector. The example in which the surface of the positive electrode active material is coated with carbon shows improved cycling performance as compared to the comparative example in which the surface of the positive electrode active material is not coated with carbon.

PTL 4 describes an electrode in which a coating layer containing conductive particles and a binder is provided on the surface of a metal foil, and an electrode mixture containing an electrode active material and 0 to 1.4% by mass of a conducting agent is stacked on the coating layer (claim 1), and also describes an electrode material in which a carbon material is attached to the surfaces of electrode active material particles (claim 2); however, the powder resistivity and peel strength of the electrode mixture are not taken into account.

CITATION LIST

Patent Literature

PTL 1: International Patent Application Publication No. 2017/208894

PTL 2: International Patent Application Publication No. 2018/168059

PTL 3: Japanese Patent Application Unexamined Publication No. 2014-17199

PTL 4: International Patent Application Publication No. 2013/005739

SUMMARY OF INVENTION

Technical Problem

Non-aqueous electrolyte secondary batteries are required to possess heat resistance that allows the batteries to maintain good battery performance even in a high temperature environment in terms of expanding the use of the batteries.

For addressing this issue, the present invention provides a positive electrode for a non-aqueous electrolyte secondary battery, which is capable of improving the heat resistance of the non-aqueous electrolyte secondary battery.

Further, the non-aqueous electrolyte secondary batteries obtained by the conventional methods are not necessarily sufficient in terms of battery performances such as rapid charge/discharge cycling performance.

For addressing this issue, the present invention provides a positive electrode for a non-aqueous electrolyte secondary battery, which is capable of improving the rapid charge/discharge cycling performance of the non-aqueous electrolyte secondary battery.

Furthermore, the methods described in PTL 3 and PTL 4 are not necessarily sufficient, and further improvement of battery performances is required.

For addressing this issue, the present invention provides a positive electrode for a non-aqueous electrolyte secondary battery, which has excellent peel strength of a positive electrode active material layer and is capable of reducing the impedance of the non-aqueous electrolyte secondary battery.

Solution to Problem

The embodiments of the present invention are as follows.
[A1] A positive electrode for a non-aqueous electrolyte secondary battery, including a current collector and a positive electrode active material layer which includes positive electrode active material particles and is provided on the current collector, wherein:
  a spreading resistance distribution of the positive electrode active material layer shows a profile with a sum of frequencies of resistance values in a range of 4.0 to 6.0 (log $\Omega$) accounting for 0.0 to 5.0%, preferably 0.0 to 4.0%, more preferably 0.0 to 3.0%, even more preferably 0.0 to 2.0%, relative to a total, 100%, of frequencies of resistance values in a range of 4.0 to 12.5 (log Ω).

[A2] The positive electrode according to [A1], wherein an average frequency B (%) of the resistance values in a range of 6.0 to 9.0 (log Ω) is larger than an average frequency A (%) of the resistance values in a range of 4.0 to 6.0 (log Ω) in the spreading resistance distribution (that is, A<B), and a difference (B−A) between the average frequency A and the average frequency B is preferably more than 0%, more preferably 0.05% or more, and even more preferably 0.20% or more.

[A3] The positive electrode according to [A1] or [A2], wherein the positive electrode active material layer further includes a conducting agent, which is preferably at least one carbon material selected from the group consisting of graphite, graphene, hard carbon. Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of the positive electrode active material.

[A4] The positive electrode according to [A3], wherein the positive electrode active material particles have, on at least a pan of surfaces thereof, a coated section including a conductive material.

[A5] The positive electrode according to [A1] or [A2], wherein the positive electrode active material layer does not contain a conducting agent, and the positive electrode active material particles have, on at least a part of surfaces thereof, a coated section comprising a conductive material.

[A6] The positive electrode according to any one of [A3] to [A5], wherein the positive electrode active material layer includes a conductive carbon, and an amount of the conductive carbon is 0.5% by mass or more and less than 3.0% by mass, preferably 1.0 to 2.8% by mass, more preferably 1.3 to 2.5% by mass, based on a total mass of the positive electrode active material layer.

[A7] The positive electrode active material according to any one of [A1] to [A6], wherein the positive electrode active material comprises a compound represented by a formula LiFexM$_{(1-x)}$PO$_4$, wherein 0≤x≤1, M is Co, Ni, Mn, Al, Ti or Zr, and the compound is preferably lithium iron phosphate represented by LiFePO$_4$.

[A8] The positive electrode according to any one of [A1] to [A7], wherein a current collector coating layer including a conductive material is present on at least a part of a surface of the positive electrode current collector on a side of the positive electrode active material layer, and an area of a section of the surface, on which the current collector coating layer is present, is preferably 10% to 100%, more preferably 30% to 100%, even more preferably 50% to 100%, based on a total area of the surface.

[A9] A non-aqueous electrolyte secondary battery, including the positive electrode of any one of [A1] to [A8], a negative electrode, and a non-aqueous electrolyte disposed between the positive electrode and the negative electrode.

[A10] A battery module or battery system including a plurality of the non-aqueous electrolyte secondary batteries of [A9].

[B1] A positive electrode for a non-aqueous electrolyte secondary battery, including a current collector and a positive electrode active material layer provided on the current collector, wherein:

the positive electrode active material layer includes a positive electrode active material and a conductive carbon material; and an amount of a low-resistance conductive carbon material having a resistivity of 0.10 Ω·cm or less is 0.5% by mass or less, preferably 0.3% by mass or less, and more preferably 0.2% by mass or less, even more preferably 0.1% by mass or less, based on a total mass of the positive electrode active material layer.

[B2] The positive electrode according to [B1], wherein an amount of a low-resistance conductive carbon material having a resistivity of 0.02 Ω·cm or less is 0.5% by mass or less, preferably 0.3% by mass or less, more preferably 0.2% by mass or less, particularly preferably 0.1% by mass or less, based on a total mass of the positive electrode active material layer.

[B3] The electrode according to [B1] or [B2], wherein:

the positive electrode active material layer includes particle main bodies consisting of the positive electrode active material, and a coating section present on at least a part of surface of each of the particle main bodies; and at least a part of the conductive carbon material forms the coating section, and a resistivity of the coating section is 0.15 Ω·cm or more, preferably 0.15 Ω·cm to 1.0 Ω·cm, more preferably 0.20 Ω·cm to 0.5 Ω·cm, even more preferably 0.25 Ω·cm to 0.4 Ω·cm.

[B4] The positive electrode to [B3], wherein an amount of the coating section is 0.9% by mass or more, preferably 1.0% by mass or more, more preferably 1.1% by mass or more, based on a total mass of the positive electrode active material layer.

[B5] The positive electrode according to any one of [B1] to [B4], wherein the positive electrode active material layer further includes a conducting agent, which is preferably at least one carbon material selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, based on a total mass of the positive electrode active material layer.

[B6] The positive electrode active material according to any one of [B1] to [B5], wherein the positive electrode active material includes a compound represented by a formula LiFexM$_{(1-x)}$PO$_4$, wherein 0≤x≤1, M is Co, Ni, Mn, Al, Ti or Zr, and the compound is preferably lithium iron phosphate represented by LiFePO$_{000000}$.

[B7] A non-aqueous electrolyte secondary battery, including the positive electrode of any one of [B1] to [B6], a negative electrode, and a non-aqueous electrolyte disposed between the positive electrode and the negative electrode.

[B8] A battery module or battery system including a plurality of the non-aqueous electrolyte secondary batteries of [B7].

[C1] A positive electrode for a non-aqueous electrolyte secondary battery, including a positive electrode current collector and a positive electrode active material layer provided on the positive electrode current collector, wherein:

the positive electrode active material layer includes a positive electrode active material;

the positive electrode active material has, on at least a part of its surface, a coated section comprising a conductive material; and the positive electrode active material layer has a powder resistivity of 10 to 1,000 Ω·cm, preferably 15 to 100 Ω·cm, more preferably 20 to 50 Ω·cm.

[C2] The positive electrode according to [C1], wherein the positive electrode active material layer includes a binder, and an amount of the binder is 0.1 to 1.0% by mass, preferably 0.3 to 0.8% by mass, based on a total mass of the positive electrode active material layer.

[C3] The positive electrode according to [C2], wherein the binder includes polyvinylidene fluoride.

[C4] The positive electrode according to any one of [C1] to [C3], wherein the positive electrode active material layer has a peel strength of 10 to 1,000 mN/cm, preferably 20 to 500 mN/cm, and more preferably 50 to 300 mN/cm.

[C5] The positive electrode according to any one of [C1] to [C4], wherein the positive electrode active material layer is present on both surfaces of the positive electrode current collector, and a total mass per unit area of the positive electrode active material layer on the both surfaces is 20 to 100 $mg/cm^2$, preferably 30 to 50 $mg/cm^2$.

[C6] The positive electrode according to any one of [C1] to [C5], wherein a current collector coating layer is present on a surface of the positive electrode current collector on a side of the positive electrode active material layer.

[C7] The positive electrode according to [C6], wherein the current collector coating layer includes carbon, and preferably includes carbon particles (such as carbon black) and a binder.

[C8] The positive electrode according to any one of [C1] to [C7], wherein the conductive material includes carbon, and is preferably composed only of carbon, with the proviso that an amount of the conductive material is preferably 0.1 to 3.0% by mass, and more preferably 0.5 to 1.5% by mass, and even more preferably 0.7 to 1.3% by mass, based on a total mass of the positive electrode active material including the coated section.

[C9] The positive electrode active material according to any one of [C1] to [C8], wherein the positive electrode active material includes a compound represented by a formula $LiFexM_{(1-x)}PO_4$, wherein $0 \le x \le 1$. M is Co, Ni, Mn, Al, Ti or Zr.

[C10] The positive electrode according to [C9], wherein the positive electrode active material is lithium iron phosphate represented by $LiFePO_4$.

[C11] The positive electrode according to any one of [C1] to [C10], wherein the positive electrode active material layer further includes a conducting agent.

[C12] The positive electrode according to [C11], wherein the conducting agent includes carbon, and is preferably at least one carbon material selected from the group consisting of graphite, graphene, hard carbon. Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of the positive electrode active material.

[C13] The positive electrode according to any one of [C1] to [C10], wherein the positive electrode active material layer does not contain a conducting agent.

[C14] A non-aqueous electrolyte secondary battery, including the positive electrode of any one of [C1] to [C13], a negative electrode, and a non-aqueous electrolyte disposed between the positive electrode and the negative electrode.

[C15] The non-aqueous electrolyte secondary battery according to [C14], which has a gravimetric energy density of 120 Wh/kg or more, preferably 130 Wh/kg or more, more preferably 140 Wh/kg or more.

[C16] A battery module or battery system including a plurality of the non-aqueous electrolyte secondary batteries of [C14] or [C15].

Advantageous Effects of Invention

The present invention can provide a positive electrode for a non-aqueous electrolyte secondary battery, which is capable of improving the heat resistance of the non-aqueous electrolyte secondary battery.

Further, the present invention can provide a positive electrode for a non-aqueous electrolyte secondary battery, which is capable of improving the rapid charge/discharge cycling performance of the non-aqueous electrolyte secondary battery.

Furthermore, the present invention can provide a positive electrode for a non-aqueous electrolyte secondary battery, which has excellent peel strength of a positive electrode active material layer and is capable of reducing the impedance of the non-aqueous electrolyte secondary battery.

DESCRIPTION OF EMBODIMENTS

In the present specification and claims, "to" indicating a numerical range means that the numerical values described before and after "to" are included as the lower limit and the upper limit of the range.

Figure 1:
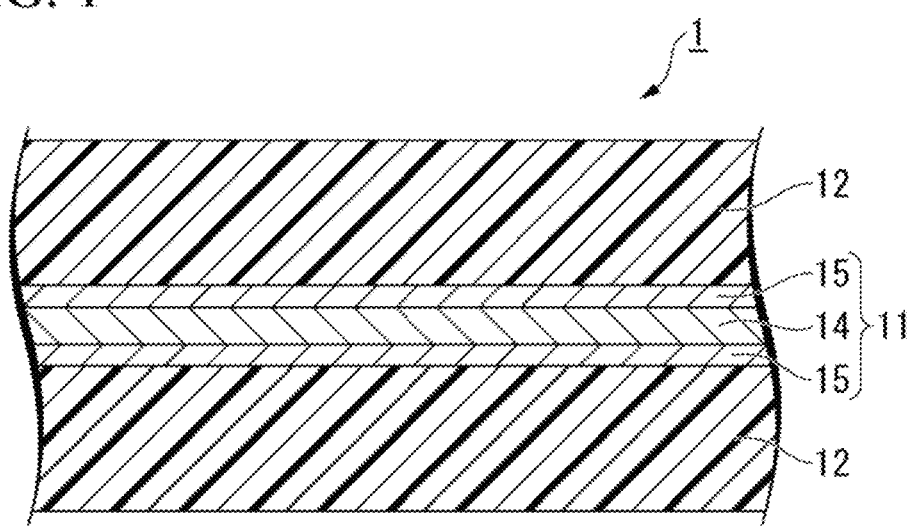
FIG. 1 is a cross-sectional view schematically showing an example of a positive electrode for a non-aqueous electrolyte secondary battery according to the present invention.
Figure 2:
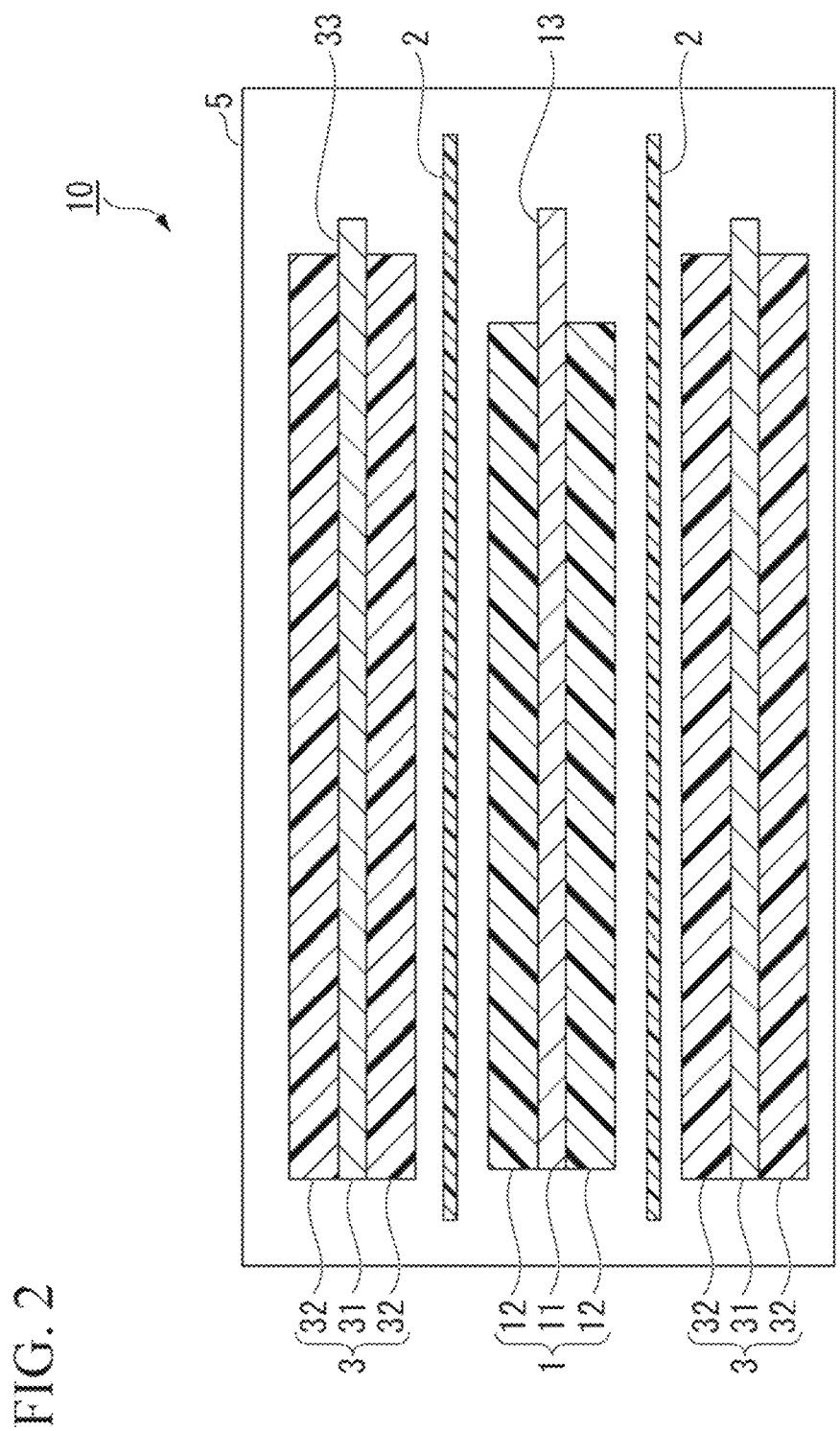
FIG. 2 is a cross-sectional view schematically showing an example of a non-aqueous electrolyte secondary battery according to the present invention.

FIG. 1 is a schematic cross-sectional view showing one embodiment of the positive electrode of the present invention for a non-aqueous electrolyte secondary battery, and FIG. 2 is a schematic cross-sectional view showing one embodiment of the non-aqueous electrolyte secondary battery of the present invention.

FIG. 1 and FIG. 2 are schematic diagrams for facilitating the understanding of the configurations, and the dimensional ratios and the like of each component do not necessarily represent the actual ones.

<Positive Electrode for Non-Aqueous Electrolyte Secondary Battery>

In the present embodiment, the positive electrode for a non-aqueous electrolyte secondary battery (also simply referred to as "positive electrode") 1 has a current collector (hereinbelow, referred to as "positive electrode current collector") 11 and a positive electrode active material layer 12.

The positive electrode active material layer 12 is present on at least one surface of the positive electrode current collector 11. The positive electrode active material layers 12 may be present on both sides of the positive electrode current collector 11.

In the example shown in FIG. 1, the positive electrode current collector 11 has current collector coating layers 15 on its surfaces facing the positive electrode active material layers 12. That is, the positive electrode current collector 11 has a positive electrode current collector main body 14 and current collector coating layers 15 that cover the positive electrode current collector main body 14 on its surfaces facing the positive electrode active material layers 12. The positive electrode current collector main body 14 alone may be used as the positive electrode current collector 11.

First Embodiment

In the first embodiment of the present invention, the positive electrode 1 (for a non-aqueous electrolyte secondary battery) includes a current collector 11 and a positive electrode active material layer 12 which includes positive electrode active material particles and is provided on the current collector 11, wherein:

a spreading resistance distribution of the positive electrode active material layer shows a profile with a sum of frequencies of resistance values in a range of 4.0 to 6.0 (log $\Omega$) accounting for 0.0 to 5.0%, preferably 0.0 to 4.0%, more preferably 0.0 to 3.0%, even more preferably 0.0 to 2.0%, relative to a total, 100%, of frequencies of resistance values in a range of 4.0 to 12.5 (log $\Omega$).

The positive electrode 1 having the above configuration can improve the heat resistance of a non-aqueous electrolyte secondary battery.

More specific explanation is made below.

(Positive Electrode Active Material Layer)

The positive electrode active material layer 12 includes positive electrode active material particles.

The positive electrode active material layer 12 preferably further includes a binder.

The positive electrode active material layer 12 may further include a conducting agent. In the context of the present specification, the term "conducting agent" refers to a conductive material of a particulate shape, a fibrous shape, etc., which is mixed with the positive electrode active material for the preparation of the positive electrode active material layer or formed in the positive electrode active material layer, and is caused to be present in the positive electrode active material layer in a form connecting the particles of the positive electrode active material.

The positive electrode active material layer 12 may further include a dispersant.

The amount of the positive electrode active material particles is preferably 80.0 to 99.9% by mass, and more preferably 90 to 99.5% k by mass, based on the total mass of the positive electrode active material layer 12.

The thickness of the positive electrode active material layer (total thickness of the positive electrode active material layers in the case where the positive electrode active material layers are formed on both sides of the positive electrode current collector) is preferably 30 to 500 μm, more preferably 40 to 400 μm, particularly preferably 50 to 300 μm. When the thickness of the positive electrode active material layer is not less than the lower limit value of the above range, the energy density of a battery with a positive electrode incorporated therein tends to improve. When the thickness is not more than the upper limit value of the above range, the peel strength of the positive electrode active material layer can be improved, thereby preventing delamination of the positive electrode active material layer during charging/discharging.

(Positive Electrode Active Material Particles)

The positive electrode active material particles preferably have, on at least a part of surfaces thereof, a coated section including a conductive material (hereinbelow, the positive electrode active material particles having such a coated section are also referred to as "coated particles"). It is more preferable that the entire surfaces of the positive electrode active material particles are coated with a conductive material for achieving more excellent battery capacity and cycling performance.

In this context, the expression "at least a part of its surface" means that the coated section of the active material particles covers 50% or more, preferably 70% or more, more preferably 90% or more, particularly preferably 100% of the total area of the entire outer surfaces of the positive electrode active material particles. This ratio (%) of the coated section (hereinafter, also referred to as "coverage") is an average value for all the positive electrode active material particles present in the positive electrode active material layer. As long as this average value is not less than the above lower limit value, the positive electrode active material layer may contain a small amount of positive electrode active material particles without the coated section. When the positive electrode active material particles without the coated section are present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The coverage can be measured by a method as follows. First, the particles in the positive electrode active material layer are analyzed by the energy dispersive X-ray spectroscopy (TEM-EDX) using a transmission electron microscope. Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as the coated section, and the ratio of the coated section to the entire circumference of the observed positive electrode active material particle can be determined as the coverage. The measurement can be performed with respect to, for example, 10 positive electrode active material particles, and an average value thereof can be used as a value of the coverage.

Further, the coated section of the active material is a layer directly formed on the surface of particles (core section) composed of only the positive electrode active material, which has a thickness of 1 nm to 100 nm, preferably 5 nm to 50 nm. This thickness can be determined by the above-mentioned TEM-EDX used for the measurement of the coverage.

The conductive material of the coated section of the active material preferably contains carbon (conductive carbon). The conductive material may be composed only of carbon, or may be a conductive organic compound containing carbon and elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material in the coated section of the active material is composed only of carbon.

The amount of the conductive material is 0.1 to 4.0% by mass, and more preferably 0.5 to 3.0% by mass, and even more preferably 0.7 to 2.5% by mass, based on total mass of the positive electrode active material particles having the coating section. Excessive amount of the conductive material is not favorable in that the conductive material may come off the surface of the positive electrode active material particles and remain as isolated conducting agent particles.

For example, the coated section of the active material is formed in advance on the surface of the positive electrode active material particles, and is present on the surface of the positive electrode active material particles in the positive electrode active material layer. That is, the coating section of the active material in the present embodiment is not one newly formed in the steps following the preparation step of a positive electrode composition. In addition, the coating section of the active material is not one that comes off in the steps following the preparation step of a positive electrode composition.

For example, the coated section stays on the surface of the positive electrode active material even when the coated positive electrode active material particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coated section stays on the surface of the positive electrode active material even when an operation to disintegrate agglomerated particles is implemented for measuring the particle size distribution of the particles in the positive electrode active material layer by the laser diffraction scattering method.

Examples of the method for producing the coated particles include a sintering method and a vapor deposition method.

Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, fluoroglucinol, hexahydroxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coated section of the active material.

Another example of the sintering method is the so-called impact sintering coating method.

The impact sintering coating method is, for example, carried our as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at mom temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

Further, the thickness of the positive electrode active material layer (total thickness of the positive electrode active material layers in the case where the positive electrode active material layers are formed on both sides of the positive electrode current collector) is preferably 30 to 500 μm, more preferably 40 to 400 μm, particularly preferably 50 to 300 μm. When the thickness of the positive electrode active material layer is not less than the lower limit value of the above range, it is possible to provide a positive electrode that can be used for manufacturing a battery having excellent energy density per unit volume. When the thickness is not more than the upper limit value of the above range, the peel strength of the positive electrode active material layer can be improved, thereby preventing delamination of the positive electrode active material layer during charging/discharging.

The positive electrode active material preferably contains a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \le x \le 1$. M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate").

The positive electrode active material particles are more preferably lithium iron phosphate particles having, on at least a part of their surfaces, a coated section including a conductive material (hereinafter, also referred to as "coated lithium iron phosphate particles"). It is more preferable that the entire surface of lithium iron phosphate particles is coated with a conductive material for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in G S Yuasa Technical Report, June 2008, Vol. 5, No. 1, pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the crushing time in the crushing process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material particles may include at least one type of other positive electrode active material particles including other positive electrode active materials than the compound having an olivine type crystal structure.

Preferable examples of the other positive electrode active materials include a lithium transition metal composite oxide. Specific examples thereof include lithium cobalt oxide (LiCoO$_2$), lithium nickel oxide (LiNiO$_2$), lithium nickel cobalt aluminum oxide (LiNi$_x$Co$_y$Al$_2$O$_2$ with the proviso that x+y+z=1), lithium nickel cobalt manganese oxide (LiNi$_x$Co$_y$Mn$_z$O$_2$ with the proviso that x+y+z=1), lithium manganese oxide (LiMn$_2$O$_4$), lithium manganese cobalt oxide (LiMnCoO$_4$), lithium manganese chromium oxide (LiMnCrO$_4$), lithium vanadium nickel oxide (LiNiVO$_4$), nickel-substituted lithium manganese oxide (e.g., LiMn$_{1.5}$Ni$_{0.5}$O$_4$), and lithium vanadium cobalt oxide (LiCoVO$_4$), as well as nonstoichiometric compounds formed by partially substituting the compounds listed above with metal elements. Examples of the metal element include one or more selected from the group consisting of Mn, Mg, Ni, Co, Cu, Zn and Ge.

The other positive electrode active particles material may have, on at least a part of surfaces thereof, the coated section described above.

The amount of the compound having an olivine type crystal structure is preferably 50% by mass or more, preferably 80% by mass or more, and even more preferably 90% by mass or more, based on the total mass of the positive electrode active material particles (including the mass of the coated section if present). This amount may be 100% by mass. When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material particles. This amount may be 100% by mass.

The thickness of the coated section of the positive electrode active material particles is preferably 1 to 100 nm.

The thickness of the coated section of the positive electrode active material particles can be measured by a method of measuring the thickness of the coated section in a transmission electron microscope (TEM) image of the positive electrode active material particles. The thickness of the coated sections on the surfaces of the positive electrode active material particles need not be uniform. It is preferable that the positive electrode active material particles have, on at least a part of surfaces thereof, the coated section having a thickness of 1 nm or more, and the maximum thickness of the coated section is 100 nm or less.

The average particle size of the positive electrode active material particles (that is, positive electrode active material powder) (including the thickness of the coated section if present) is, for example, preferably 0.1 to 20.0 µm, and more preferably 0.2 to 10.0 µm. When two or more types of positive electrode active materials are used, the average particle size of each of such positive electrode active materials may be within the above range.

The average particle size of the positive electrode active material in the present specification is a volume-based median particle size measured using a laser diffraction/scattering particle size distribution analyzer.

(Binder)

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination.

When the positive electrode active material layer 12 contains a binder, the amount of the binder in the positive electrode active material layer 12 is preferably 4.0% by mass or less, more preferably 2.0% by mass or less. When the amount of the binder is not more than the above upper limit value, the proportion of the substance that does not contribute to the conduction of lithium ions in the positive electrode active material layer 12 is reduced, and the battery performance can be further improved.

When the positive electrode active material layer 12 contains a binder, the lower limit of the amount of the binder is preferably 0.1% by mass or more, and more preferably 0.5% by mass or more, based on the total mass of the positive electrode active material layer 12.

That is, when the positive electrode active material layer 12 contains a binder, the amount of the binder is preferably 0.1% by mass to 4.0% by mass, and more preferably 0.5% by mass to 2.0% by mass, based on the total mass of the positive electrode active material layer 12.

(Conducting Agent)

Examples of the conducting agent contained in the positive electrode active material layer 12 include carbon materials such as carbon black (e.g., Ketjen black, and acetylene black), graphite, graphene, hard carbon, and carbon nanotube (CNT). With respect to the conducting agent, a single type thereof may be used alone or two or more types thereof may be used in combination.

The amount of the conducting agent in the positive electrode active material layer is, for example, preferably 4 parts by mass or less, more preferably 3 parts by mass or less, and even more preferably 1 part by mass or less, relative to 100 parts by mass of the positive electrode active material. It is particularly preferable that the positive electrode active material layer does not contain a conducting agent, and it is desirable that there are no isolated conducting agent particles (for example, isolated carbon particles).

The "conducting agent" is a conductive material independent of the positive electrode active material, and may include a conductive material having a fibrous form (for example, carbon nanotube) as well as isolated conducting agent particles.

The conducting agent in contact with the positive electrode active material particles in the positive electrode active material layer is not regarded as the conductive material constituting the coated section of the positive electrode active material.

When the conducting agent is incorporated into the positive electrode active material layer, the lower limit value of the amount of the conducting agent is appropriately determined according to the type of the conducting agent, and is, for example, more than 0.1% by mass, based on the total mass of the positive electrode active material layer.

That is, when the positive electrode active material layer 12 contains a conducting agent, the amount of the conducting agent is preferably 0.2 to 4 parts by mass, more preferably 0.3 to 3 parts by mass, and even more preferably 0.5 to 1 pan by mass, with respect to 100 parts by mass of the positive electrode active material.

In the context of the present specification, the expression "the positive electrode active material layer does not contain a conducting agent" or similar expression means that the positive electrode active material layer does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer, then, it is judged that substantially no conducting agent is contained.

The average particle size of particles used as the conducting agent (that is, powder used as the conducting agent) is, for example, 0.001 to 1.0 μm, and more preferably 0.01 to 0.10 μm. When two or more types of the conducting agents are used, the average particle size of each of such conducting agents may be within the above range.

The average particle size of the conducting agent in the present specification is a volume-based median particle size measured using a laser diffraction/scattering particle size distribution analyzer.

(Dispersant)

The dispersant contained in the positive electrode active material layer 12 is an organic substance, and examples thereof include polyvinylpyrrolidone (PVP), polyvinyl alcohol (PVA), polyvinyl butyral (PVB), and polyvinylformal (PVF).

With respect to these dispersants, a single type thereof may be used individually or two or more types thereof may be used in combination.

(Positive Electrode Current Collector Main Body)

The positive electrode current collector body 14 is formed of a metal material. Examples of the metal material include conductive metals such as copper, aluminum, titanium, nickel, and stainless steel.

The thickness of the positive electrode current collector main body 14 is preferably, for example, 8 to 40 μm, and more preferably 10 to 25 μm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.

(Current Collector Coating Layer)

It is preferable that the positive electrode current collector main body 14 has, on at least a part of its surface, a current collector coating layer 15. The current collector coating layer 15 contains a conductive material.

In this context, the expression "at least a part of its surface" means 10% to 100%, preferably 30% to 100%, more preferably 50% to 100% of the area of the surface of the positive electrode current collector main body.

The conductive material in the current collector coating layer 15 preferably contains carbon (conductive carbon). The conductive material is more preferably one composed only of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 μm.

The thickness of the current collector coating layer can be measured by a method that measures the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer 15 having a thickness of 0.1 μm or more is present on at least a part of the surface of the positive electrode current collector main body 14, and the maximum thickness of the current collector coating layer is 4.0 μm or less.

(Spreading Resistance Distribution of Positive Electrode Active Material Layer)

In the present embodiment, the spreading resistance distribution of the positive electrode active material layer shows a profile with a sum of frequencies of resistance values in a range of 4.0 to 6.0 (log $\Omega$) accounting for 0.0 to 5.0%, preferably 0.0 to 4.0%, more preferably 0.0 to 3.0%, even more preferably 0.0 to 2.0%, relative to a total, 100%, of frequencies of resistance values in a range of 4.0 to 12.5 (log $\Omega$).

In the context of the present specification, the spread resistance distribution of the positive electrode active material layer is measured with respect to a cross section of the positive electrode active material layer as a measurement target, using a scanning spread resistance microscope (SSRM), following the procedure described in the <<Method for measuring spreading resistance distribution>> described below.

<<Method for Measuring Spreading Resistance Distribution>>

The SSRM applies a bias voltage to a measurement target, scans its surface with a conductive probe, and two-dimensionally measures the distribution of resistance values (spreading resistance values) directly under the probe.

The spreading resistance distribution is measured using the SSRM under the following conditions: DC bias voltage +2.0 V, scan size 60 μm×60 μm, measurement point number (number of data points) 1024×1024, to thereby obtain a graph of frequency distribution (spreading resistance distribution) with spreading resistance as an abscissa and frequency as an ordinate.

The frequency on the ordinate is a relative frequency (unit: %, also referred to simply as "frequency"), relative to a total, 100%, of frequencies (number of data points) of resistance values in the range of 4.0 log Ω ($1\times10^{-1}$ Ω) or more and 12.5 log Ω ($1\times10^{12.5}$ Ω) or less.

When the sum of frequencies of resistance values in the range of 4.0 to 6.0 (log Ω) is 5.0% or less in the spreading resistance distribution, excellent effect is achieved in terms of improving the heat resistance of the non-aqueous electrolyte secondary battery.

A portion with a low resistance of 4.0 to 6.0 (log Ω) present in the cross section of the positive electrode active material layer is presumed to become an active site which facilitates side reactions between the positive electrode and the electrolytic solution when the non-aqueous electrolyte secondary battery is exposed to high temperatures.

The sum of frequencies of resistance values in the range of 4.0 to 6.0 (log Ω) can be reduced, for example, by reducing the number of isolated conducting agent particles (for example, isolated carbon particles).

In the spreading resistance distribution, an average frequency A (%) of the resistance values in the range of 4.0 to 6.0 (log Ω) is a frequency (%) when the graph in the resistance value range of 4.0 to 6.0 (log Ω) is flattened. Specifically, the average frequency A is calculated by dividing the sum of resistance values at the measurement points in the range of 4.0 to 6.0 (log Ω) by the number of measurement points.

In the spreading resistance distribution, an average frequency B (%) of the resistance values in the range of 6.0 to 9.0 (log Ω) is a frequency (%) when the graph in the resistance value range of 6.0 to 9.0 (log Ω) is flattened. Specifically, the average frequency B is calculated by dividing the sum of resistance values at the measurement points in the range of 6.0 to 9.0 (log 2) by the number of measurement points. In this context, when a resistance value of 6.0 (log Ω) is present in the spreading resistance distribution of the positive electrode active material layer, the frequency thereof is not considered in the calculation of the average frequency A, but is considered in the calculation of the average frequency B.

In the present embodiment, it is preferable that the average frequency B is larger than the average frequency A (that is, A<B). When A<B, excellent effect is achieved in terms of improving the heat resistance of the non-aqueous electrolyte secondary battery. In addition, sufficient output of the non-aqueous electrolyte secondary battery is likely to be achieved.

The average frequency B is, for example, preferably 0.05 to 0.5%, more preferably 0.1 to 0.4%, even more preferably 0.15 to 0.35%. The average frequency B can be increased, for example, by increasing the amount of conductive material present as the coated section of the active material.

When A<B, the difference B−A is preferably more than 0%, more preferably 0.05% or more, even more preferably 0.20% or more. Further, the ratio of B to A (B/A) is preferably more than 1, more preferably 5 or more, even more preferably 10 or more.

(Conductive Carbon Content)

In the present embodiment, the positive electrode active material layer 12 preferably includes conductive carbon. Examples of the embodiment in which the positive electrode active material layer contains the conductive carbon include the following embodiments 1 to 3.

Embodiment 1: The positive electrode active material layer contains a conducting agent; and the conducting agent includes conductive carbon.

Embodiment 2: The positive electrode active material layer contains a conducting agent; the positive electrode active material particles have, on at least a part of surfaces thereof, a coated section containing a conductive material; and one or both of the conductive material in the coated section of the active material and the conducting agent includes conductive carbon.

Embodiment 3: The positive electrode active material layer does not contain a conducting agent; the positive electrode active material particles have, on at least a part of surfaces thereof, a coated section containing a conductive material; and the conductive material in the coated section of the active material includes conductive carbon.

The embodiment 3 is more preferable in that excellent effect is achieved in terms of improving the heat resistance of the non-aqueous electrolyte secondary battery.

The amount of the conductive carbon is preferably 0.5% by mass or more and less than 3.0% by mass, more preferably 1.0 to 2.8% by mass, even more preferably 1.3 to 2.5% by mass, based on the total mass of the positive electrode active material layer.

When the amount of conductive carbon in the positive electrode active material layer is not less than the lower limit of the above range, sufficient conductive path is formed and excellent low resistance performance is achieved. When the amount of conductive carbon is not more than the upper limit, the amount of isolated conductive carbon is suppressed, so that the positive electrode active material layer has with less reactive sites.

The conductive carbon content based the total mass of the positive electrode active material layer can be measured by <<Method for measuring conductive carbon content>> described below with respect to a dried product (powder), as a measurement target, obtained by vacuum-drying, at 120° C., the positive electrode active material layer detached from the positive electrode. The particle size of the dried powder as the measurement target is not particularly limited as long as the conductive carbon content can be appropriately measured by the method described below.

For example, the measurement target may be one obtained by detaching the outermost surface of the positive electrode active material layer with a depth of several μm using a spatula or the like, and vacuum drying the resulting powder in an environment of 120° C.

The conductive carbon to be measured by the <<Method for measuring conductive carbon content>> described below includes carbon in the coating section of the active material, and carbon in the conducting agent. Carbon in the hinder is not included in the conductive carbon to be measured. Carbon in the dispersant is not included in the conductive carbon to be measured.

<<Method for Measuring Conductive Carbon Content>>
(Measurement Method A)

A sample having a weight w1 is taken from a homogeneously mixed product of the measurement target, and the sample is subjected to thermogravimetry differential thermal analysis (TG-DTA) implemented by following step A1 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained.

Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)/w1\times100 \tag{a1}$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)/w1\times100 \tag{a2}$$

(Measurement method B)

0.0001 mg of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount M1 is determined following the procedure of the step A1 of the measurement method A. By subtracting M1 from M3, the conductive carbon content (unit: % by mass) is obtained.

(Burning Conditions)

Temperature of combustion furnace: 1150° C.
Temperature of reduction furnace: 850° C.
Helium flow rate: 200 mL/min.
Oxygen flow rate: 25 to 30 mL/min.

(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion (F) content (unit: % by mass) measured by combustion ion chromatography based on the tube combustion method, the atomic weight (19) of fluorine in the monomers constituting PVDF, and the atomic weight (12) of carbon in the PVDF.

PVDF content(unit:% by mass)=fluoride ion content(unit:% by mass)×64/38PVDF-derived carbon amount M4(unit:% by mass)=fluoride ion content(unit:% by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by 19F-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

When the dispersant is contained, the conductive carbon content (unit: % by mass) can be obtained by subtracting M4 from M3, and further subtracting therefrom the amount of carbon belonging to the dispersant.

Depending on the composition of the positive electrode active material and the like, an appropriate method can be selected from (Measurement method A) to (Measurement method C) to determine the conductive carbon content, but it is preferable to determine the conductive carbon content by the (Measurement method B) in terms of versatility, etc.

These methods are described in the following publications:

Toray Research Center, The TRC News No. 117 (September 2013), pp. 34-37, [Searched on Feb. 10, 2021], Internet <https://www.toray-research.co.jp/technical-info/trcnews/pdf/TRC117(34-37).pdf>

TOSOH Analysis and Research Center Co., Ltd., Technical Report No. T1019 Sep. 20, 2017, [Searched on Feb. 10, 2021], Internet <http://www.tosoh-arc.co.jp/techrepo/files/tarc00522/T1719N.pdf>

<<Analytical Method for Conductive Carbon>>

The conductive carbon in the coated section of the positive electrode active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context, "near the particle surface" means a region to the depth of approximately 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present isolatedly and have low resistance can be judged to be the conducting agent.

In this context, a trace amount of carbon considered to be an impurity and a trace amount of carbon unintentionally detached from the surface of the positive electrode active material during production are not judged to be the conducting agent.

Using any of these methods, it is possible to verify whether or not the conducting agent formed of carbon material is contained in the positive electrode active material layer.

(Volume Density of Positive Electrode Active Material Layer)

In the present embodiment, the volume density of the positive electrode active material layer 12 is preferably 2.20 to 2.70 g/cm$^3$, more preferably 2.25 to 2.50 g/cm$^3$ The volume density of the positive electrode active material layer can be measured by, for example, the following measuring method.

The thicknesses of the positive electrode 1 and the positive electrode current collector 11 are each measured with a micrometer, and the difference between these two thickness values is calculated as the thickness of the positive electrode active material layer 12. With respect to the thickness of the positive electrode 1 and the thickness of the positive electrode current collector 11, each of these thickness values is an average value of the thickness values measured at five or more arbitrarily chosen points. The thickness of the positive electrode current collector 11 may be measured at the exposed section 13 of the positive electrode current collector, which is described below.

The mass of the measurement sample punched out from the positive electrode 1 so as to have a predetermined area is measured, from which the mass of the positive electrode current collector 11 measured in advance is subtracted to calculate the mass of the positive electrode active material layer 12.

The volume density of the positive electrode active material layer 12 is calculated by the following formula (1).

$$\text{Volume density (unit: g/cm}^3\text{)} = \text{mass of positive electrode active material layer (unit: g)}/[(\text{thickness of positive electrode active material layer (unit: cm)}) \times \text{area of measurement sample (unit: cm}^2\text{)}] \quad (1)$$

<Method for Producing Positive Electrode>

The present embodiment's method for producing the positive electrode 1 includes a composition preparation step of preparing a positive electrode composition containing a positive electrode active material, and a coating step of coating the positive electrode composition on the positive electrode current collector 11.

For example, the positive electrode 1 can be produced by applying the positive electrode composition containing a positive electrode active material and a solvent onto the positive electrode current collector 11, followed by drying to remove the solvent to form the positive electrode active material layer 12. The positive electrode composition may contain a conducting agent. The positive electrode composition may contain a binder. The positive electrode composition may contain a dispersant.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing (rolling) using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone. With respect to these solvents, a single type thereof may be used individually or two or more types thereof may be used in combination.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing. FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials, lithium titanate (LTO), silicon, silicon monoxide and the like. Examples of the carbon material include carbon black (e.g., Ketjen black, and acetylene black), graphite, graphene, hard carbon, and carbon nanotube (CNT). With respect to each of the negative electrode active material and the conducting agent, a single type thereof may be used alone or two or more types thereof may be used in combination.

Examples of the material of the negative electrode current collector 31 include those listed above as examples of the material of the positive electrode current collector 11.

Examples of the binder in the negative electrode composition include polyacrylic acid (PAA), lithium polyacrylate (PAALI), polyvinylidene fluoride (PVDF), polyvinylidene fluoride-propylene hexafluoride copolymer (PVDF-HFP), styrene-butadiene rubber (SBR), polyvinyl alcohol (PVA), polyethylene oxide (PEO), polyethylene glycol (PEG), carboxymethyl cellulose (CMC), polyacrylonitrile (PAN), polyimide (PI) and the like. With respect to the binder, a single type thereof may be used alone or two or more types thereof may be used in combination.

Examples of the solvent in the negative electrode composition include water and organic solvents. Examples of the organic solvent include alcohols such as methanol, ethanol, 1-propanol and 2-propanol; chain or cyclic amides such as N-methylpyrrolidone (NMP) and N,N-dimethylformamide (DMF); and ketones such as acetone. With respect to these solvents, a single type thereof may be used individually or two or more types thereof may be used in combination.

The sum of the amount of the negative electrode active material and the amount of the conducting agent is preferably 80.0 to 99.9% by mass, and more preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hindered-phenolic antioxidants, monophenolic antioxidants, bisphenolic antioxidants, and polyphenolic antioxidants; hinderedamine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used.

As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO_2CF_2CF_3)_2$, $LiN(COCF_3)_2$, and $LiN(COCF_2CF_3)_2$, as well as mixture of two or more of these salts.

The non-aqueous electrolyte secondary battery of the present embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

As shown in the Examples described below, the present invention can improve the heat resistance of the non-aqueous electrolyte secondary battery. For example, it is possible to achieve an output retention of 50% or more, preferably 60% or more, which is determined based on the outputs measured in a 1 C output test before and after storage at 80° C. for 20 days.

Therefore, the use of the non-aqueous electrolyte secondary battery based on the present invention is easier even in such a high temperature environment that makes it difficult to use conventional non-aqueous electrolyte secondary batteries. For example, the present invention can provide a non-aqueous electrolyte secondary battery usable as an alternative to a lead storage battery used in an engine room of a vehicle.

Second Embodiment

In the second embodiment of the present invention, the positive electrode (for a non-aqueous electrolyte secondary battery) 1 includes a current collector 11 and a positive electrode active material layer 12 provided on the current collector 11, wherein:

the positive electrode active material layer 12 includes a positive electrode active material and a conductive carbon material; and an amount of a low-resistance conductive carbon material having a resistivity of 0.10 Ω·cm or less is 0.5% by mass or less, based on the total mass of the positive electrode active material layer 12.

The present inventors have investigated a deterioration phenomenon caused by rapid charge/discharge of a non-aqueous electrolyte secondary battery. The deterioration of the battery caused by rapid charge/discharge progresses as the resistance components increase due to the decomposition of the electrolytic solution and the reaction between the resulting decomposition products and the electrode. The mechanisms underlying the decomposition of the electrolytic solution have not so far been sufficiently analyzed, but the present inventors have found that the deterioration reaction is triggered by the reaction between the conductive carbon material having a low resistivity and the electrolytic solution. The present invention has been made based on this finding.

The positive electrode 1 having the above configuration can improve the rapid charge/discharge cycling performance of a non-aqueous electrolyte secondary battery.

More specific explanation is made below.

(Positive Electrode Active Material Layer)

The positive electrode active material layer 12 includes positive electrode active material particles.

The positive electrode active material layer 12 preferably further includes a binder.

The positive electrode active material layer 12 may further include a conducting agent. In the context of the present specification, the term "conducting agent" refers to a conductive material of a particulate shape, a fibrous shape, etc., which is mixed with the positive electrode active material for the preparation of the positive electrode active material layer or formed in the positive electrode active material layer, and is caused to be present in the positive electrode active material layer in a form connecting the particles of the positive electrode active material.

The positive electrode active material layer 12 may further include a dispersant.

The amount of the positive electrode active material particles is preferably 80.0 to 99.9% by mass, and more preferably 90 to 99.5% by mass, based on the total mass of the positive electrode active material layer 12.

The thickness of the positive electrode active material layer (total thickness of the positive electrode active material layers in the case where the positive electrode active material layers are formed on both sides of the positive electrode current collector) is preferably 30 to 500 μm, more preferably 40 to 400 μm, particularly preferably 50 to 300 μm. When the thickness of the positive electrode active material layer is not less than the lower limit value of the above range, the energy density of a battery tends to improve. When the thickness is not more than the upper limit value of the above range, the peel strength of the positive electrode active material layer can be improved, thereby preventing delamination of the positive electrode active material layer during charging/discharging.

(Positive Electrode Active Material Particles)

The positive electrode active material particles include particle main bodies consisting of the positive electrode active material. The particle main bodies preferably have, on at least a part of surfaces thereof, a coating section that is a conductive material (hereinbelow, the positive electrode active material particles having such a coating section are also referred to as "coated particles"). It is more preferable that the entire surface of the particle main bodies is coated with a conductive material for achieving more excellent battery capacity and cycling performance.

In this context, the expression "at least a part of surfaces thereof" means that the coating section of the active material covers 50% or more, preferably 70% or more, more preferably 90% or more, particularly preferably 100% of the total area of the entire outer surfaces of the particle main bodies. This ratio (%) of the coating section (hereinafter, also referred to as "coverage") is an average value for all the positive electrode active material particles present in the positive electrode active material layer. As long as this average value is not less than the above lower limit value, the positive electrode active material layer may contain a small amount of positive electrode active material particles without the coating section. When the positive electrode active material particles without the coating section arm present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The coverage can be measured by a method as follows. First, the particles in the positive electrode active material layer are analyzed by the energy dispersive X-ray spectroscopy (TEM-EDX) using a transmission electron microscope. Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as a coating section, and the ratio of the coating section to the entire circumference of the observed positive electrode active material particle can be determined as the coverage. The measurement can be performed with respect to, for example, 10 positive electrode active material particles, and an average value thereof can be used as a value of the coverage.

Further, the coating section of the active material is a layer directly formed on the surface of particle main bodies (core sections) composed of only the positive electrode active material, which has a thickness of 1 nm to 100 nm, preferably 5 nm to 50 nm. This thickness can be determined by the above-mentioned TEM-EDX used for the measurement of the coverage.

The conductive material of the coating section of the active material is preferably a conductive carbon material containing carbon (conductive carbon). The conductive material may be composed only of carbon, or may be a conductive organic compound containing carbon and other elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material constituting the coating section of the active material is a conductive carbon material composed of only conductive carbon. In the context of the present specification, the expression "composed only of conductive carbon" means that the amount of impurities other than conductive carbon is less than the quantification limit.

The amount of the coating section is preferably 0.1 to 4.0% by mass, more preferably 0.5 to 3.0% by mass, and even more preferably 0.7 to 2.5% by mass, based on total mass of the positive electrode active material particles having the coating section.

As the amount of the coating section of the active material increases, the resistance value of the positive electrode active material layer tends to decrease. For example, the powder resistivity of the positive electrode active material layer decreases, and the rapid charge/discharge cycle capacity retention tends to improve further.

For example, the coating section of the active material is formed in advance on the surface of the positive electrode active material particles, and is present on the surface of the positive electrode active material particles in the positive electrode active material layer. That is, the coating section of the active material in the present embodiment is not one newly formed in the steps following the preparation step of a positive electrode composition. In addition, the coating section of the active material is not one that comes off in the steps following the preparation step of a positive electrode composition.

For example, the coated section stays on the surface of the positive electrode active material even when the coated particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coating section stays on the surface of the positive electrode active material even when an operation to disintegrate agglomerated particles is implemented for measuring the particle size distribution of the particles in the positive electrode active material layer by the laser diffraction scattering method.

Examples of the method for producing the coated particles include a sintering method and a vapor deposition method.

Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, fluoroglucinol, hexahydroxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coating section of the active material.

Another example of the sintering method is the so-called impact sintering coating method.

The impact sintering coating method is, for example, carried our as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at room temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

The particle main bodies of the positive electrode active material particles preferably contain a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \leq x \leq 1$. M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate").

The positive electrode active material particles are more preferably coated lithium iron phosphate particles including lithium iron phosphate particles (particle main bodies) having, on at least a part of their surfaces, a coating section including a conductive material. It is more preferable that the entire surface of lithium iron phosphate particles is coated with a conductive material for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in GS Yuasa Technical Report, June 2008. Vol. 5. No. 1. pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the crushing time in the crushing process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material particles may include at least one type of other positive electrode active material particles in which the particle main bodies are formed of other positive electrode active materials than the compound having an olivine type crystal structure.

Preferable examples of the other positive electrode active materials include a lithium transition metal composite oxide. Specific examples thereof include lithium cobalt oxide (LiCoO$_2$), lithium nickel oxide (LiNiO$_2$), lithium nickel cobalt aluminum oxide (LiNi$_x$Co$_y$Al$_z$O$_2$ with the proviso that x+y+z=1), lithium nickel cobalt manganese oxide (LiNi$_x$Co$_y$Mn$_z$O$_2$ with the proviso that x+y+z=1), lithium manganese oxide (LiMn$_2$O$_4$), lithium manganese cobalt oxide (LiMnCoO$_4$), lithium manganese chromium oxide (LiMnCrO$_4$), lithium vanadium nickel oxide (LiNiVO$_4$), nickel-substituted lithium manganese oxide (e.g., LiMn$_{1.5}$Ni$_{0.5}$O$_4$), and lithium vanadium cobalt oxide (LiCoVO$_4$), as well as nonstoichiometric compounds formed by partially substituting the compounds listed above with metal elements. Examples of the metal element include one or more selected from the group consisting of Mn, Mg, Ni, Co, Cu, Zn and Ge.

The other positive electrode active particles material may have the coating section described above on at least a part of surfaces of the particle main bodies.

The amount of the compound having an olivine type crystal structure is preferably 50% by mass or more, preferably 80% by mass or more, and even more preferably 90% by mass or more, based on the total mass of the positive electrode active material (including the mass of the coating section if present). This amount may be 100% by mass. When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material particles. This amount may be 100% by mass.

The thickness of the coating section of the positive electrode active material particles is preferably 1 to 100 nm.

The thickness of the coating section of the positive electrode active material particles can be measured by a method of measuring the thickness of the coating section in a transmission electron microscope (TEM) image of the positive electrode active material particles. The thickness of the coating section on the surfaces of the particle main bodies need not be uniform. It is preferable that the particle main bodies, on at least a part of surfaces thereof, the coating section having a thickness of 1 nm or more, and the maximum thickness of the coating section is 100 nm or less.

The average particle size of the positive electrode active material particles (including the thickness of the coating section if present) is, for example, preferably 0.1 to 20.0 µm, and more preferably 0.2 to 10.0 µm. When two or more types of positive electrode active materials are used, the average particle size of each of such positive electrode active materials may be within the above range. The average particle size of the positive electrode active material particles in the present specification is a volume-based median particle size measured using a laser diffraction/scattering particle size distribution analyzer.

(Binder)

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination.

When the positive electrode active material layer contains a binder, the amount of the binder in the positive electrode active material layer is preferably 4.0% by mass or less, more preferably 2.0% by mass or less. When the amount of the binder is not more than the above upper limit value, the proportion of the substance that does not contribute to the conduction of lithium ions in the positive electrode active material layer is reduced, and the battery performance can be further improved.

When the positive electrode active material layer contains a binder, the lower limit of the amount of the binder is preferably 0.1% by mass or more, and more preferably 0.5% by mass or more, based on the total mass of the positive electrode active material layer.

That is, when the positive electrode active material layer 12 contains a binder, the amount of the binder is preferably 0.1 to 1% by mass, and more preferably 0.1 to 0.5% by mass, based on the total mass of the positive electrode active material layer 12.

(Conducting Agent)

Examples of the conducting agent contained in the positive electrode active material layer 12 include carbon materials such as carbon black (e.g., Ketjen black, and acetylene black), graphite, graphene, hard carbon, and carbon nanotube (CNT). With respect to the conducting agent, a single type thereof may be used alone or two or more types thereof may be used in combination.

The conductive material as the conducting agent may be composed only of carbon, or may be a conductive organic compound containing carbon and other elements other than carbon. Examples of the other elements include nitrogen, hydrogen, oxygen and the like. In the conductive organic compound, the amount of the other elements is preferably 10 atomic % or less, and more preferably 5 atomic % or less.

The conducting agent is more preferably a conductive carbon material composed only of conductive carbon. In the context of the present specification, the expression "composed only of conductive carbon" means that the amount of impurities other than conductive carbon is less than the quantification limit.

The amount of the conducting agent in the positive electrode active material layer is, for example, preferably 4 parts by mass or less, more preferably 3 parts by mass or less, and even more preferably 1 part by mass or less, based on the total mass of the positive electrode active material layer. It is particularly preferable that the positive electrode active material layer does not contain a conducting agent, and it is desirable that there are no isolated conducting agent particles (for example, isolated carbon particles). The "conducting agent" is a conductive material independent of the positive electrode active material, and may include a conductive material having a fibrous form (for example, carbon nanotube) as well as isolated conducting agent particles.

The conducting agent in contact with the positive electrode active material particles in the positive electrode active material layer is not regarded as the conductive material constituting the coating section of the positive electrode active material.

When the conducting agent is incorporated into the positive electrode active material layer, the lower limit value of the amount of the conducting agent is appropriately determined according to the type of the conducting agent, and is, for example, more than 0.1% by mass, based on the total mass of the positive electrode active material layer.

That is, when the positive electrode active material layer 12 contains a conducting agent, the amount of the conducting agent is preferably more than 0.1% by mass and 1% by mass or less, more preferably 0.1% by mass and 0.5% by mass or less, and even more preferably more than 0.1% by mass and 0.2% by mass or less, based on the total mass of the positive electrode active material layer 12.

In the context of the present specification, the expression "the positive electrode active material layer does not contain a conducting agent" or similar expression means that the positive electrode active material layer does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer, then, it is judged that substantially no conducting agent is contained.
(Dispersant)

The dispersant contained in the positive electrode active material layer 12 is an organic substance, and examples thereof include polyvinylpyrrolidone (PVP), polyvinyl alcohol (PVA), polyvinyl butyral (PVB), and polyvinylformal (PVF). With respect to these dispersants, a single type thereof may be used individually or two or more types thereof may be used in combination.
(Positive Electrode Current Collector Main Body)

The positive electrode current collector body 14 is formed of a metal material. Examples of the metal material include conductive metals such as copper, aluminum, titanium, nickel, and stainless steel.

The thickness of the positive electrode current collector main body 14 is preferably, for example, 8 to 40 µm, and more preferably 10 to 25 µm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.
(Current Collector Coating Layer)

It is preferable that the positive electrode current collector main body 14 has, on at least a part of its surface, a current collector coating layer 15. The current collector coating layer 15 contains a conductive material.

In this context, the expression "at least a part of its surface" means 10% to 100%, preferably 30% to 100%, more preferably 50% to 100% of the area of the surface of the positive electrode current collector main body.

The conductive material in the current collector coating layer 15 preferably contains carbon (conductive carbon). The conductive material is more preferably one composed only of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 µm.

The thickness of the current collector coating layer can be measured by a method that measures the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer 15 having a thickness of 0.1 µm or more is present on at least a part of the surface of the positive electrode current collector main body 14, and the maximum thickness of the current collector coating layer is 4.0 µm or less.
(Conductive Carbon Material)

In the present embodiment, the positive electrode active material layer 12 contains conductive carbon material. The conductive carbon material in the positive electrode active material layer is, for example, a conducting agent or a coating section of the active material.

Examples of the embodiment in which the positive electrode active material layer contains the conductive carbon material include the following embodiments 1 to 3.

Embodiment 1: The positive electrode active material layer does not contain a conducting agent; the particle main bodies of the positive electrode active material particles have, on at least a part of surfaces thereof, a coating section; and the coating section of the active material is a conductive carbon material.

Embodiment 2: The positive electrode active material layer contains a conducting agent; the particle main bodies of the positive electrode active material particles have, on at least a part of surfaces thereof, a coating section; and one or both of the coating section of the active material and the conducting agent is a conductive carbon material. It is preferable that both of the coating section of the active material and the conducting agent are a conductive carbon material.

Embodiment 3: The positive electrode active material particles do not have a coating section; the positive electrode active material layer contains a conducting agent; and the conducting agent is a conductive carbon material.

The embodiment 1 or 2 is preferable, and the embodiment 1 is more preferable for achieving excellent effect of improving the rapid charge/discharge cycling performance of the non-aqueous electrolyte secondary battery.
(Amount of Low Resistance Conductive Carbon Material)

The positive electrode active material layer in the present embodiment has less amount of conductive carbon material with low resistance among the conductive carbon materials present in the positive electrode active material layer.

Specifically, the amount of a low-resistance conductive carbon material having a resistivity of 0.10 Ω·cm or less (hereinafter, also referred to as "low-resistance conductive carbon material (C1)") is 0.5% by mass or less, preferably 0.3% by mass or less, more preferably 0.2% by mass or less, particularly preferably 0.1% by mass or less, based on the total mass of the positive electrode active material layer. This amount may be zero.

When the amount of the low-resistance conductive carbon material (C1) is not more than the above upper limit value, excellent effect is achieved in terms of improving the rapid charge/discharge cycling performance.

Further, the amount of a low-resistance conductive carbon material having a resistivity of 0.02 Ω·cm or less (hereinafter, also referred to as "low-resistance conductive carbon material (C2)") is 0.5% by mass or less, more preferably 0.3% by mass or less, even more preferably 0.2% by mass or less, particularly preferably 0.1% by mass or less, based on the total mass of the positive electrode active material layer. This amount may be zero. In this context, the present invention encompasses even an embodiment in which the amount of the low-resistance conductive carbon material (C2) is not more than the specific upper limit value described above, but the amount of the low-resistance conductive carbon material (C1) exceeds the specific upper limit value described above (for example, more than 0.5% by mass). That is, in the present invention, the amount of the low-resistance conductive carbon material (C1) and/or the low-resistance conductive carbon material (C2), based on the total mass of the positive electrode active material layer, is preferably 0.5% by mass or less, more preferably 0.3% by mass or less, even more preferably 0.2% by mass or less, particularly preferably 0.1% by mass or less. This amount may be zero.

When the amount of the low-resistance conductive carbon material (C2) is not more than the above upper limit value, excellent effect is achieved in terms of improving the rapid charge/discharge cycling performance.

The amount of the low-resistance conductive carbon material (C1) or (C2) in the positive electrode active material layer can be reduced by reducing the amount of the conductive carbon particles isolatedly present in the positive electrode active material layer. For example, by reducing the blending amount of the conducting agent having a resistivity of 0.10 Ω·cm or less to zero or as much as possible, the amount of the low-resistance conductive carbon material (C1) can be reduced. Further, by reducing the blending amount of the conducting agent having a resistivity of 0.02 Ω·cm or less to zero or as much as possible, the amount of the low-resistance conductive carbon material (C2) can be reduced.

The resistivity of the conducting agent can be measured by the <<Method for measuring resistivity $R^4$ of conducting agent>> described below.

(Resistivity and Amount of Coating Section of Active Material)

The positive electrode active material layer 12 preferably has the coating section which is a conductive carbon material. The resistivity of the coating section of the active material is preferably 0.15 Ω·cm or more, preferably 0.20 Ω·cm or more, and more preferably 0.25 Ω·cm or more. When the resistivity of the coating section of the active material is not less than the above lower limit value, a good rapid charge/discharge cycle capacity retention is likely to be achieved.

The upper limit of the resistivity of the coating section of the active material is preferably 1.0 Ω·cm or less, more preferably 0.5 Ω·cm or less, and more preferably 0.4 Ω·cm or less, in that the resistance of the positive electrode active material layer does not become too high.

That is, the resistivity of the coating section of the active material is preferably 0.15 Ω·cm to 1.0 Ω·cm, more preferably 0.20 Ω·cm to 0.5 Ω·cm, and even more preferably 0.25 Ω·cm to 0.4 Ω·cm. The resistivity of the coating section of the active material can be controlled by adjusting the conditions for coating the surfaces of the particle main bodies with the carbon material.

The resistivity of the coating section of the active material can be measured by the <<Method for measuring resistivity $R^2$ of coating section of active material>> described below.

The amount of the coating section is 0.9% by mass or more, more preferably 1.0% by mass or more, and even more preferably 1.1% by mass or more, based on the total mass of the positive electrode active material layer. The upper limit of the amount of the coating section of the active material is preferably such a value that the conductive carbon content with respect to the total mass of the positive electrode active material layer does not exceed the preferable range described below.

When the amount of the coating section of the active material is not less than the lower limit value in the above range, excellent effect is achieved in terms of reducing the resistance of the positive electrode active material layer. When the amount is not more than the upper limit value, the energy density of a battery is likely to increase.

The amount of the coating section of the active material with respect to the total mass of the positive electrode active material layer can be controlled by adjusting the amount ratio of the coating section of the active material (conductive carbon material) to the positive electrode active material particles, and the blending amount of the positive electrode active material particles.

(Conductive Carbon Content)

The amount of the conductive carbon is preferably 0.9 to 4.0% by mass, 1.0 to 3.0% by mass, and even more preferably 1.1 to 2.5% by mass, based on the total mass of the positive electrode active material layer. When the amount of the conductive carbon is not less than the lower limit value in the above range, excellent effect is achieved in terms of reducing the resistance of the positive electrode active material layer. When the amount is not mom than the upper limit value, the energy density of a battery is likely to increase.

When the coating section of the active material and the conducting agent are conductive carbon materials composed only of conductive carbon, the amount of the conductive carbon with respect to the total mass of the positive electrode active material layer is the sum of the amounts of the coating section of the active material and the conducting agent, each with respect to the total mass of the positive electrode active material layer.

The conductive carbon content based the total mass of the positive electrode active material layer can be measured by <<Method for measuring conductive carbon content>> described below with respect to a powder (particles) obtained by scraping off the positive electrode active material layer with a spatula or the like from the positive electrode current collector as a measurement target powder.

The conductive carbon to be measured by the <<Method for measuring conductive carbon content>> described below includes carbon in the coating section of the active material, and carbon in the conducting agent. Carbon in the binder is not included in the conductive carbon to be measured. Carbon in the dispersant is not included in the conductive carbon to be measured.

When a powder obtained by scraping off the positive electrode active material layer from the positive electrode current collector is used as the measurement target powder, the positive electrode active material layer at a point which is at least 5 μm away from the interface between the positive electrode current collector and the positive electrode active material layer is scraped off for recovering only the powder constituting the positive electrode active material layer. That is, when the current collector coating layer is present on the positive electrode current collector main body, the current collector coating layer is not scraped off. A product obtained by vacuum-drying the scraped-off powder at 120° C. for 4 hours is used as the measurement target powder. The same applies to the measurement methods described below unless otherwise specified.

(Powder Resistivity of Positive Electrode Active Material Layer)

The powder resistivity of the positive electrode active material layer 12 is preferably 10 to 1,000 Ω·cm, preferably 11 to 100 Ω·cm, and more preferably 12 to 50 Ω·cm.

The powder resistivity of the positive electrode active material layer can be measured by <Method for measuring powder resistivity $R^1$> described below with respect to a powder (particles) obtained by scraping off the positive electrode active material layer with a spatula or the like from the positive electrode current collector as a measurement target powder. For avoiding the influence of measurement variation, it is preferable to set the pressure applied such that the mass density of the pressure-molded sample is in the range of 2.0 to 2.4 g/cm³.

When the powder resistivity of the positive electrode active material layer is not less than the lower limit of the above range, a high cycle capacity retention is achieved. When the powder resistivity is not more than the upper limit, a rapid charge/discharge performance can be achieved.

The powder resistivity can be adjusted, for example, by the type of the positive electrode active material, the amount of the coating of the active material, the amount of the conducting agent, and the like. A larger amount of the coating of the active material tends to lower the powder resistivity. Further, a smaller amount of the conducting agent tends to increase the powder resistivity.

<<Method for measuring resistivity $R^2$ of coating section of active material>>

In the positive electrode active material particles having a coating section on the surface of the particle main body formed of the positive electrode active material, a positive electrode active material (e.g., lithium iron phosphate) with a significantly higher resistivity than the conductive carbon material (coating section of the active material) can be regarded as an insulator.

The resistivity $R^2$ (unit: Ω·cm) of the conductive carbon material in the measurement target powder, which is composed of the conductive carbon material and the insulator, can be obtained by the following formula (1).

$$R^2 = R^1 \times Q^1 \times \rho^1 / \rho^2 \quad (1)$$

In formula (1), $R^1$ is the powder resistivity (unit: Ω·cm) of the measurement target powder. $R^1$ can be measured by the <Method for measuring powder resistivity $R^1$> described below.

$Q^1$ (unit: % by volume) is the volume ratio of the conductive carbon material to the total volume of the measurement target powder (unit: % by volume). $Q^1$ can be obtained by the <Method for obtaining volume ratio $Q^1$>> described below.

$\rho^1$ (unit: g/cm³) is the mass density of the measurement target powder, and can be obtained in the <Method for measuring powder resistivity $R^1$> from the mass and external dimension of a molded sample obtained by pressure-molding the measurement target powder.

$\rho^2$ (unit: g/cm³) is the true density of the measurement target powder, and can be measured by an automatic dry density meter (using He).

<Method for Measuring Powder Resistivity $R^1$>

The powder resistivity $R^1$ of the measurement target powder is measured using a powder resistivity measuring instrument.

In the powder resistivity measurement, the measurement target powder is charged into a measuring cell, and the powder resistivity (unit: Ω·cm) of the measurement target powder when pressure-molded and the thickness of the molded sample are measured. The pressure to be applied can be set according to the object to be measured.

The mass density at the time of measurement. $\rho^1$ (unit: g/cm³), is obtained from the mass and thickness values of the molded sample.

<Method for Determining Volume Ratio $Q^1$>

The volume ratio $Q^1$ (unit: % by volume) is obtained by the following formula (2).

$$Q^1 = (m^1/\rho^4) / \{(1-m^1)/\rho^3 + m^1/\rho^4\} \quad (2)$$

In formula (2), $m^1$ (unit: % by mass) is the amount of the conductive carbon material (coating section of the active material) in the measurement target powder. The amount of the conductive carbon material (coating section of the active material) composed only of conductive carbon can be measured by any of the measurement methods A to C in the <<Method for measuring conductive carbon content>> described below.

$\rho^3$ (unit: g/cm³) is the true density of insulator (positive electrode active material) in the measurement target powder. For example, the theoretical value for lithium iron phosphate is 3.6.

$\rho^4$ (unit: g/cm³) is the true density of the conductive carbon material (coating section of the active material coating) in the measurement target powder. For example, the theoretical value for amorphous carbon is 2.0.

In the manner described above, the resistivity $R^2$ of the coating section of the active material can be determined by the above formula (1), using the positive electrode active material particles (raw material) as the measurement target powder. When the conductivity of the positive electrode active material is high, the resistivity $R^2$ of the coating section of the active material can be obtained by taking the resistivity of the positive electrode active material into consideration.

When the positive electrode active material layer does not substantially contain the conducting agent, the resistivity $R^2$ of the coating section of the active material is determined by the above formula (1) with respect to a powder obtained by scraping off the positive electrode active material layer from the positive electrode current collector as a measurement target powder. In the measurement target powder, a positive electrode active material and a binder (e.g., polyvinylidene fluoride) with a significantly higher resistivity than the conductive carbon material can be regarded as an insulator. The presence or absence of the conducting agent in the positive electrode active material layer can be determined by the <<Method for analyzing conductive carbon>> described below.

<<Method for Measuring Resistivity $R^4$ of Conducting Agent>>

The resistivity $R^1$ (unit: Ω·cm) of the conducting agent as a conductive carbon material can be obtained by the following formula (3).

$$R^4 = R^3 \times \rho^5 / \rho^6 \quad (3)$$

In formula (3). $R^1$ is the powder resistivity of the conducting agent (unit: Ω·cm). $R^1$ can be measured by the <<Method for measuring resistivity $R^3$>> described above with respect to the conducting agent (raw material) as the measurement target powder.

$\rho^5$ (unit: g/cm³) is the mass density of the conducting agent, and can be obtained in the <Method for measuring powder resistivity $R^1$> from the mass and external dimension of a molded sample obtained by pressure-molding the measurement target powder.

$\rho^6$ (unit: g/cm$^3$) is the true density of the conducting agent, and can be measured by an automatic dry density meter (using He).

For avoiding the influence of measurement variation, it is preferable to implement the measurement of the powder resistivity $R^1$ while setting the pressure applied such that the mass density of the pressure-molded sample is in the range of 0.6 to 0.8 g/cm$^3$.

In the manner described above, the resistivity $R^4$ of the conducting agent can be determined by the above formula (3), using the conducting agent (raw material) as the measurement target powder.

Further, the resistivity $R^4$ of the conducting agent in the positive electrode active material layer can be determined by identifying the type of the conducting agent in the positive electrode active material layer using the spreading resistance distribution of the positive electrode active material layer, and using the identified conducting agent (raw material) as the measurement target powder.

For example, when the spreading resistance distribution of the positive electrode active material layer is measured by the <Method for measuring spreading resistance distribution> described below, the conducting agent, if present, in the positive electrode active material layer allows a peak to emerge in the region where the spreading resistance is 6 (unit: log Ω) or less. A sample for identifying a conducting agent, in which a known conducting agent is embedded in the binder, is used as a measurement target, and the identification is carried out by the spreading resistance distribution measurement implemented in the same manner as described above.

<<Method of Measuring Amount of Conducting Agent>>

In the spreading resistance distribution of the positive electrode active material layer measured by the <Method for measuring spreading resistance distribution> described below, the ratio of the peak area corresponding to the conducting agent to the total peak area is determined.

Specifically, with the total frequency of the spreading resistance values in the range of 4.0 to 12.5 (log Ω) being defined as 100%, the ratio of a sum of frequencies of the spread resistance values in the range of 4.0 to 6.0 (log Ω) is obtained.

This ratio is regarded as the volume ratio α1 (unit: % by volume) of the conducting agent to the positive electrode active material layer, and the amount α2 (unit: % by mass) of the conducting agent, based on the total mass of the positive electrode active material layer, can be determined by the following formula (4).

$$\alpha 2 = \alpha 1 \times \rho^5 / \rho^6 \quad (4)$$

In formula (4). $\rho^5$ and $\rho^6$ are respectively the same as $\rho^5$ and $\rho^6$ in formula (3) above.

<Method for Measuring Spreading Resistance Distribution>

The spreading resistance distribution is measured using a scanning spreading resistance microscope (SSRM).

The SSRM applies a bias voltage to a measurement target, scans its surface with a conductive probe, and two-dimensionally measures the distribution of resistance values (spreading resistance values) directly under the probe.

The spreading resistance distribution is measured using the SSRM under the following conditions: DC bias voltage +2.0 V, scan size 60 μm×60 μm, measurement point number (number of data points) 1024×1024, to thereby obtain a graph of frequency distribution (spreading resistance distribution) with spreading resistance as an abscissa and frequency as an ordinate.

The frequency on the ordinate is a relative frequency (unit: %, also referred to simply as "frequency"), relative to a total, 100%, of frequencies (number of data points) of resistance values in the range of 4.0 log Ω(1×10$^4$Ω) or more and 12.5 log Ω(1×10$^{12.5}$Ω) or less.

<<Method for Measuring Conductive Carbon Content>>

(Measurement Method A)

A sample having a weight w1 is taken from a homogeneously mixed product of the measurement target, and the sample is subjected to thermogravimetry-differential thermal analysis (TG-DTA) implemented by following step A1 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained. Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)w1\times100 \quad (a1)$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)/w1\times100 \quad (a2)$$

(Measurement Method B)

0.0001 mg of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount M1 is determined following the procedure of the step A1 of the measurement method A. By subtracting M1 from M3, the conductive carbon content (unit: % by mass) is obtained.

(Burning Conditions)

Temperature of combustion furnace: 1150° C.
Temperature of reduction furnace: 850° C.
Helium flow rate: 200 mL/min.
Oxygen flow rate: 25 to 30 mL/min.

(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion (F) content (unit: % by mass) measured by combustion ion chromatography based on the tube combustion method, the atomic weight (19) of fluorine in the monomers constituting PVDF, and the atomic weight (12) of carbon in the PVDF.

> PVDF content (unit: % by mass)=fluoride ion content (unit: % by mass)×64/38 PVDF-derived carbon amount M4 (unit: % by mass)=fluoride ion content (unit: % by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by 19F-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

When the dispersant is contained, the conductive carbon content (unit: % by mass) can be obtained by subtracting M4 from M3, and further subtracting therefrom the amount of carbon belonging to the dispersant.

Depending on the composition of the positive electrode active material and the like, an appropriate method can be selected from (Measurement method A) to (Measurement method C) to determine the conductive carbon content, but it is preferable to determine the conductive carbon content by the (Measurement method B) in terms of versatility, etc.

These methods are described in the following publications:

Toray Research Center, The TRC News No. 117 (September 2013). pp. 34-37. [Searched on Feb. 10, 2021]. Internet <https://www.toray-research.co.jp/technical-info/trcnews/pdf/TRC117(34-37).pdf>

TOSOH Analysis and Research Center Co., Ltd., Technical Report No. T1019 Sep. 20, 2017, [Searched on Feb. 10, 2021], Internet <http://www.tosoh-arc.co.jp/techrepo/files/tarc00522/T1719N.pdf>

<<Analytical Method for Conductive Carbon>>

The conductive carbon in the coated section of the positive electrode active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context, "near the particle surface" means a region to the depth of approximately 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present isolatedly and have low resistance can be judged to be the conducting agent.

In this context, a trace amount of carbon considered to be an impurity and a trace amount of carbon unintentionally detached from the surface of the positive electrode active material during production are not judged to be the conducting agent.

Using any of these methods, it is possible to verify whether or not the conducting agent formed of carbon material is contained in the positive electrode active material layer.

<Method for Producing Positive Electrode>

The present embodiment's method for producing the positive electrode 1 includes a composition preparation step of preparing a positive electrode composition containing a positive electrode active material, and a coating step of coating the positive electrode composition on the positive electrode current collector 11.

For example, the positive electrode 1 can be produced by applying the positive electrode composition containing a positive electrode active material and a solvent onto the positive electrode current collector 11, followed by drying to remove the solvent to form the positive electrode active material layer 12. The positive electrode composition may contain a conducting agent. The positive electrode composition may contain a binder. The positive electrode composition may contain a dispersant.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone. With respect to these solvents, a single type thereof may be used individually or two or more types thereof may be used in combination.

As the positive electrode active material in the positive electrode composition, it is preferable to use positive electrode active material particles with a coating section which is a conductive carbon material and has a resistivity of 0.15 $\Omega \cdot cm$ or more. The blending amount of the positive electrode active material particles is preferably set so that the amount of the coating section of the active material is 0.9% by mass or more with respect to the mass of the positive electrode composition excluding the solvent. When the positive electrode composition does not contain a conducting agent, the amount of the coating section of the active material is preferably 4.0% by mass or less.

When the positive electrode composition contains at least one conducting agent which is a conductive carbon material as well as the positive electrode active material particles, it is preferable to select the type and blending amount of the conducting agent such that the amount of the low-resistance conducting agent having a resistivity of 0.10 $\Omega \cdot cm$ or less is 0.5% by mass or less, with respect to the mass of the positive electrode composition excluding the solvent. Further, it is preferable to set the blending amount of the positive electrode active material particles and the conducting agent such that the sum of the amounts of the coating section of the active material and the conducting agent is 4.0% by mass or less, with respect to the mass of the positive electrode composition excluding the solvent.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing. FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials, lithium titanate (LTO), silicon, silicon monoxide and the like. Examples of the carbon material include carbon black (e.g., Ketjen black, and acetylene black), graphite, graphene, hard carbon, and carbon nanotube (CNT). With respect to each of the negative electrode active material and the conducting agent, a single type thereof may be used alone or two or more types thereof may be used in combination.

Examples of the material of the negative electrode current collector 31 include those listed above as examples of the material of the positive electrode current collector 11. Examples of the binder in the negative electrode composition include polyacrylic acid (PAA), lithium polyacrylate (PAALI), polyvinylidene fluoride (PVDF), polyvinylidene fluoride-propylene hexafluoride copolymer (PVDF-HFP), styrene-butadiene rubber (SBR), polyvinyl alcohol (PVA), polyethylene oxide (PEO), polyethylene glycol (PEG), carboxymethyl cellulose (CMC), polyacrylonitrile (PAN), polyimide (PI) and the like. With respect to the binder, a single type thereof may be used alone or two or more types thereof may be used in combination.

Examples of the solvent in the negative electrode composition include water and organic solvents. Examples of the organic solvent include alcohols such as methanol, ethanol, 1-propanol and 2-propanol; chain or cyclic amides such as N-methylpyrrolidone (NMP) and N,N-dimethylformamide (DMF); and ketones such as acetone. With respect to these solvents, a single type thereof may be used individually or two or more types thereof may be used in combination.

The sum of the amount of the negative electrode active material and the amount of the conducting agent is preferably 80.0 to 99.9% by mass, and more preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hindered-phenolic antioxidants, monophenolic antioxidants, bisphenolic antioxidants, and polyphenolic antioxidants; hinderedamine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used.

As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO_2CF_2CF_3)_2$, $LiN(COCF_3)_2$, and $LiN(COCF_2CF_3)_2$, as well as mixture of two or more of these salts.

The non-aqueous electrolyte secondary battery of the present embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

Third Embodiment

In the third embodiment of the present invention, the positive electrode 1 (for a non-aqueous electrolyte secondary battery) includes a positive electrode current collector 11 and a positive electrode active material layer 12 provided on the positive electrode current collector 11, wherein:

the positive electrode active material layer 12 includes a positive electrode active material;

the positive electrode active material has, on at least a part of its surface, a coated section including a conductive material; and the positive electrode active material layer 12 has a powder resistivity of 10 to 1,000 Ω·cm.

The positive electrode 1 having the above configuration has excellent peel strength and is capable of reducing the impedance of the non-aqueous electrolyte secondary battery.

More specific explanation is made below.

(Positive Electrode Active Material Layer)

The positive electrode active material layer 12 includes a positive electrode active material. The positive electrode active material layer 12 preferably further includes a binder. The positive electrode active material layer 12 may further include a conducting agent.

The shape of the positive electrode active material is preferably particulate.

The amount of the positive electrode active material is preferably 80.0 to 99.9% by mass, and more preferably 90 to 99.5% by mass, based on the total mass of the positive electrode active material layer 12.

The positive electrode active material has, on at least a part of its surface, a coated section including a conductive material (hereinbelow, the positive electrode active material particles having such a coated section are also referred to as "coated particles"). The conductive material of the coated section of the active material preferably contains carbon. The conductive material may be composed only of carbon, or may be a conductive organic compound containing carbon and elements other than carbon. Examples of the other elements include nitrogen, hydrogen, oxygen and the like. In the conductive organic compound, the amount of the other elements is preferably 10 atomic % or less, and more preferably 5 atomic % or less.

It is more preferable that the conductive material in the coated section of the active material is composed only of carbon.

The amount of the conductive material is 0.1 to 3.0% by mass, and more preferably 0.5 to 1.5% by mass, and even more preferably 0.7 to 1, 3% by mass, based on the total mass of the positive electrode active material including the coated section.

In the coated particles, a coated section containing a conductive material (hereinafter, also referred to as "coated section of the active material") is present on the surfaces of the positive electrode active material particles. The coated section of the active material particles enables the positive electrode active material particles to further enhance the battery capacity and cycling performance.

For example, the coated section of the active material is formed in advance on the surface of the positive electrode active material particles, and is present on the surface of the positive electrode active material particles in the positive electrode active material layer. That is, the coated section of the active material in the present embodiment is not one newly formed in the steps following the preparation step of a positive electrode composition. In addition, the coated section of the active material is not one that comes off in the steps following the preparation step of a positive electrode composition.

For example, the coated section stays on the surface of the positive electrode active material even when the coated particles are mixed with a solvent by a mixer or the like during the preparation of a positive electrode composition. Further, the coated section stays on the surface of the positive electrode active material even when the positive electrode active material layer is detached from the positive electrode and then put into a solvent to dissolve the binder contained in the positive electrode active material layer in the solvent. Furthermore, the coated section stays on the surface of the positive electrode active material even when an operation to disintegrate agglomerated particles is implemented for measuring the particle size distribution of the particles in the positive electrode active material layer by the laser diffraction scattering method.

The coated section of the active material particles preferably covers 50% or more, preferably 70% or more, and more preferably 90% or more of the total area of the entire outer surfaces of the positive electrode active material particles.

That is, the coated particles have a core section that is a positive electrode active material and an coated section that covers the surface of the core section, and the area ratio (coverage) of the coated section with respect to the surface area of the core section is preferably 50% or more, more preferably 70% or more, and even more preferably 90% or more.

Examples of the method for producing the coated particles include a sintering method and a vapor deposition method.

Examples of the sintering method include a method that sinters an active material composition (for example, a slurry) containing the positive electrode active material particles and an organic substance at 500 to 1000° C. for 1 to 100 hours under atmospheric pressure. Examples of the organic substance added to the active material composition include salicylic acid, catechol, hydroquinone, resorcinol, pyrogallol, fluoroglucinol, hexahydroxybenzene, benzoic acid, phthalic acid, terephthalic acid, phenylalanine, water dispersible phenolic resins, saccharides (e.g., sucrose, glucose and lactose), carboxylic acids (e.g., malic acid and citric acid), unsaturated monohydric alcohols (e.g., allyl alcohol and propargyl alcohol), ascorbic acid, and polyvinyl alcohol. This sintering method sinters an active material composition to allow carbon in the organic material to be fused to the surface of the positive electrode active material to thereby form the coated section of the active material.

Another example of the sintering method is the so-called impact sintering coating method.

The impact sintering coating method is, for example, carried our as follows. In an impact sintering coating device, a burner is ignited using a mixed gas of a hydrocarbon and oxygen as a fuel to burn the mixed gas in a combustion chamber, thereby generating a flame, wherein the amount of oxygen is adjusted so as not to exceed its equivalent amount that allows complete combustion of the fuel, to thereby lower the flame temperature. A powder supply nozzle is installed downstream thereof, from which a solid-liquid-gas three-phase mixture containing a combustion gas as well as a slurry formed by dissolving an organic substance for coating in a solvent is injected toward the flame. The injected fine powder is accelerated at a temperature not higher than the transformation temperature, the sublimation temperature, and the evaporation temperature of the powder material by increasing the amount of combustion gas maintained at room temperature to lower the temperature of the injected fine powder. This allows the particles of the powder to be instantly fused on the active material by impact, thereby forming coated particles of the positive electrode active material.

Examples of the vapor deposition method include a vapor phase deposition method such as a physical vapor deposition method (PVD) and a chemical vapor deposition method (CVD), and a liquid phase deposition method such as plating.

The coverage can be measured by a method as follows. First, the particles in the positive electrode active material layer are analyzed by the energy dispersive X-ray spectroscopy (TEM-EDX) using a transmission electron microscope. Specifically, an elemental analysis is performed by EDX with respect to the outer peripheral portion of the positive electrode active material particles in a TEM image. The elemental analysis is performed on carbon to identify the carbon covering the positive electrode active material particles. A section with a carbon coating having a thickness of 1 nm or more is defined as a coated section, and the ratio of the coated section to the entire circumference of the observed positive electrode active material particle can be determined as the coverage. The measurement can be performed with respect to, for example, 10 positive electrode active material particles, and an average value thereof can be used as a value of the coverage.

Further, the coated section of the active material is a layer directly formed on the surface of particles (core section) composed of only the positive electrode active material, which has a thickness of 1 nm to 100 nm, preferably 5 nm to 50 nm. This thickness can be determined by the above-mentioned TEM-EDX used for the measurement of the coverage.

In the present invention, the area ratio (coverage) of the coated section of the active material in the coated particles is particularly preferably 100% with respect to the surface area of the core section.

This coverage (%) is an average value for all the positive electrode active material particles present in the positive electrode active material layer. As long as this average value is not less than the above lower limit value, the positive electrode active material layer may contain positive electrode active material particles without the coated section. When the positive electrode active material particles (single particles) without the coated section are present in the positive electrode active material layer, the amount thereof is preferably 30% by mass or less, more preferably 20% by mass or less, and particularly preferably 10% by mass or less, with respect to the total mass of the positive electrode active material particles present in the positive electrode active material layer.

The positive electrode active material preferably contains a compound having an olivine crystal structure.

The compound having an olivine crystal structure is preferably a compound represented by the following formula: $LiFe_xM_{(1-x)}PO_4$ (hereinafter, also referred to as "formula (I)"). In the formula (I), $0 \leq x \leq 1$. M is Co, Ni, Mn, Al, Ti or Zr. A minute amount of Fe and M (Co, Ni, Mn, Al, Ti or Zr) may be replaced with another element so long as the replacement does not affect the physical properties of the compound. The presence of a trace amount of metal impurities in the compound represented by the formula (I) does not impair the effect of the present invention.

The compound represented by the formula (I) is preferably lithium iron phosphate represented by $LiFePO_4$ (hereinafter, also simply referred to as "lithium iron phosphate"). The compound is more preferably lithium iron phosphate particles each having, on at least a part of its surface, a coated section including a conductive material (hereinafter, also referred to as "coated lithium iron phosphate particles"). It is more preferable that the entire surface of lithium iron phosphate particles is coated with a conductive material for achieving more excellent battery capacity and cycling performance.

The coated lithium iron phosphate particles can be produced by a known method.

For example, the coated lithium iron phosphate particles can be obtained by a method in which a lithium iron phosphate powder is prepared by following the procedure described in Japanese Patent No. 5098146, and at least a part of the surface of lithium iron phosphate particles in the powder is coated with carbon by following the procedure described in GS Yuasa Technical Report, June 2008. Vol. 5, No. 1, pp. 27-31 and the like.

Specifically, first, iron oxalate dihydrate, ammonium dihydrogen phosphate, and lithium carbonate are weighed to give a specific molar ratio, and these are pulverized and mixed in an inert atmosphere. Next, the obtained mixture is heat-treated in a nitrogen atmosphere to prepare a lithium iron phosphate powder. Then, the lithium iron phosphate powder is placed in a rotary kiln and heat-treated while supplying methanol vapor with nitrogen as a carrier gas to obtain a powder of lithium iron phosphate particles having at least a part of their surfaces coated with carbon.

For example, the particle size of the lithium iron phosphate powder can be adjusted by optimizing the pulverization time in the pulverization process. The amount of carbon coating the particles of the lithium iron phosphate powder can be adjusted by optimizing the heating time and temperature in the step of implementing heat treatment while supplying methanol vapor. It is desirable to remove the carbon particles not consumed for coating by subsequent steps such as classification and washing.

The positive electrode active material may contain other positive electrode active materials than the compound having an olivine type crystal structure.

Preferable examples of the other positive electrode active materials include a lithium transition metal composite oxide. Specific examples thereof include lithium cobalt oxide ($LiCoO_2$), lithium nickel oxide ($LiNiO_2$), lithium nickel cobalt aluminum oxide ($LiNi_xCo_yAl_zO_2$ with the proviso that x+y+z=1), lithium nickel cobalt manganese oxide ($LiNi_xCo_yMn_zO_2$ with the proviso that x+y+z=1), lithium manganese oxide ($LiMn_2O_4$), lithium manganese cobalt oxide ($LiMnCoO_4$), lithium manganese chromium oxide ($LiMnCrO_4$), lithium vanadium nickel oxide ($LiNiVO_4$), nickel-substituted lithium manganese oxide (e.g., $LiMn_{1.5}Ni_{0.5}O_4$), and lithium vanadium cobalt oxide ($LiCoVO_4$), as well as nonstoichiometric compounds formed by partially substituting the compounds listed above with metal elements. Examples of the metal element include one or more selected from the group consisting of Mn, Mg, Ni, Co, Cu, Zn and Ge.

With respect to the other positive electrode active materials, a single type thereof may be used individually or two or more types thereof may be used in combination.

The other positive electrode active material may have, on at least a part of its surface, the coated section described above.

The amount of the compound having an olivine type crystal structure is preferably 50% by mass or more, preferably 80% by mass or more, and even more preferably 90% by mass or more, based on the total mass of the positive electrode active material. This amount may be 100% by mass.

When the coated lithium iron phosphate particles are used, the amount of the coated lithium iron phosphate particles is preferably 50% by mass or more, more preferably 80% by mass or more, and even more preferably 90% by mass or more, based on the total mass of the positive electrode active material. This amount may be 100% by mass.

As mentioned above, the thickness of the coated section of the positive electrode active material is preferably 1 to 100 nm.

As mentioned above, the thickness of the coated section of the positive electrode active material can be measured by a method of measuring the thickness of the coated section in a transmission electron microscope (TEM) image of the positive electrode active material. The thickness of the coated section on the surface of the positive electrode active material need not be uniform. It is preferable that the positive electrode active material has, on at least a part of its surface, the coated section having a thickness of 1 nm or more, and the maximum thickness of the coated section is 100 nm or less.

The average particle size of the positive electrode active material particles (that is, positive electrode active material powder) is, for example, preferably 0.1 to 20.0 μm, and more preferably 0.2 to 10.0 μm. When two or more types of positive electrode active materials are used, the average particle size of each of such positive electrode active materials may be within the above range.

The average particle size of the positive electrode active material in the present specification is a volume-based median particle size measured using a laser diffraction/scattering particle size distribution analyzer.

The binder that can be contained in the positive electrode active material layer 12 is an organic substance, and examples thereof include polyacrylic acid, lithium polyacrylate, polyvinylidene fluoride, polyvinylidene fluoride-hexafluoropropylene copolymers, styrene butadiene rubbers, polyvinyl alcohol, polyvinyl acetal, polyethylene oxide, polyethylene glycol, carboxymethyl cellulose, polyacrylic nitrile, and polyimide. With respect to the binder, a single type thereof may be used alone or two or more types thereof may be used in combination. It is preferable that the binder contains polyvinylidene fluoride in that a high binding performance can be achieved with addition of a small amount.

When the positive electrode active material layer 12 contains a binder, the amount of the binder in the positive electrode active material layer 12 is preferably 0.1 to 1.0% by mass, and more preferably 0.3 to 0.8% by mass or more, based on the total mass of the positive electrode active material layer 12. When the amount of the binder in the positive electrode active material layer 12 is not less than the lower limit of the above range, excellent effect is achieved in term of improving the peel strength. When the amount is not more than the upper limit, excellent effect is achieved in terms of reducing the impedance of the non-aqueous electrolyte secondary battery.

Examples of the conducting agent contained in the positive electrode active material layer 12 include carbon materials such as carbon black (e.g., Ketjen black, and acetylene black), graphite, graphene, hard carbon, and carbon nanotube (CNT). With respect to the conducting agent, a single type thereof may be used alone or two or more types thereof may be used in combination.

The amount of the conducting agent in the positive electrode active material layer 12 is, for example, preferably 4 parts by mass or less, more preferably 3 parts by mass or less, and even more preferably 1 part by mass or less, relative to 100 parts by mass of the positive electrode active material.

When the conducting agent is incorporated into the positive electrode active material layer 12, the lower limit value of the amount of the conducting agent is appropriately determined according to the type of the conducting agent, and is, for example, more than 0.1% by mass, based on the total mass of the positive electrode active material layer 12.

In the context of the present specification, the expression "the positive electrode active material layer 12 does not contain a conducting agent" or similar expression means that the positive electrode active material layer 12 does not substantially contain a conducting agent, and should not be construed as excluding a case where a conducting agent is contained in such an amount that the effects of the present invention are not affected. For example, if the amount of the conducting agent is 0.1% by mass or less, based on the total mass of the positive electrode active material layer 12, then, it is judged that substantially no conducting agent is contained.

(Positive Electrode Current Collector)

The positive electrode current collector body 14 is formed of a metal material. Examples of the metal material include conductive metals such as copper, aluminum, titanium, nickel, and stainless steel.

The thickness of the positive electrode current collector main body 14 is preferably, for example, 8 to 40 μm, and more preferably 10 to 25 μm.

The thickness of the positive electrode current collector main body 14 and the thickness of the positive electrode current collector 11 can be measured using a micrometer. One example of the measuring instrument usable for this purpose is an instrument with the product name "MDH-25M", manufactured by Mitutoyo Co., Ltd.

(Current Collector Coating Layer)

The current collector coating layer 15 contains a conductive material.

The conductive material in the current collector coating layer 15 preferably contains carbon (conductive carbon), and more preferably consists exclusively of carbon.

The current collector coating layer 15 is preferred to be, for example, a coating layer containing carbon particles such as carbon black and a binder. Examples of the binder for the current collector coating layer 15 include those listed above as examples of the binder for the positive electrode active material layer 12.

With regard to the production of the positive electrode current collector 11 in which the surface of the positive electrode current collector main body 14 is coated with the current collector coating layer 15, for example, the production can be implemented by a method in which a slurry containing the conductive material, the binder, and a solvent is applied to the surface of the positive electrode current collector main body 14 with a known coating method such as a gravure method, followed by drying to remove the solvent.

The thickness of the current collector coating layer 15 is preferably 0.1 to 4.0 μm.

The thickness of the current collector coating layer can be measured by a method that measures the thickness of the coating layer in a transmission electron microscope (TEM) image or a scanning electron microscope (SEM) image of a cross section of the current collector coating layer. The thickness of the current collector coating layer need not be uniform. It is preferable that the current collector coating layer 15 having a thickness of 0.1 μm or more is present on at least a part of the surface of the positive electrode current collector main body 14, and the maximum thickness of the current collector coating layer is 4.0 μm or less.

(Method for Producing Positive Electrode)

For example, the positive electrode 1 of the present embodiment can be produced by a method in which a positive electrode composition containing a positive electrode active material, a binder and a solvent is coated on the positive electrode current collector 11, followed by drying to remove the solvent to thereby form a positive electrode active material layer 12. The positive electrode composition may contain a conducting agent.

The thickness of the positive electrode active material layer 12 can be adjusted by a method in which a layered body composed of the positive electrode current collector 11 and the positive electrode active material layer 12 formed thereon is placed between two flat plate jigs and, then, uniformly pressurized in the thickness direction of this layered body. For this purpose, for example, a method of pressurizing using a roll press can be used.

The solvent for the positive electrode composition is preferably a non-aqueous solvent. Examples of the solvent include alcohols such as methanol, ethanol, 1-propanol and 2-propanol; chain or cyclic amides such as N-methylpyrrolidone and N,N-dimethylformamide; and ketones such as acetone. With respect to these solvents, a single type thereof may be used individually or two or more types thereof may be used in combination.

When at least one of the conductive material and the conducting agent covering the positive electrode active material contains carbon, the conductive carbon content is preferably 0.5 to 5.0% by mass, more preferably 1.0 to 3.5% by mass, and even more preferably 1.0 to 2.5% by mass, based on the total mass of the positive electrode active material layer 12.

The conductive carbon content based the total mass of the positive electrode active material layer 12 can be measured by <<Method for measuring conductive carbon content>> described below with respect to a dried product (powder), as a measurement target, obtained by vacuum-drying, at 120° C. the positive electrode active material layer 12 detached from the current collector. The particle size of the dried powder as the measurement target is not particularly limited as long as the conductive carbon content can be appropriately measured by the method described below.

The conductive carbon to be measured by the <<Method for measuring conductive carbon content>> described below includes carbon in the coated section of the positive electrode active material, and carbon in the conducting agent. Carbon in the binder is not included in the conductive carbon to be measured.

When the conductive carbon content based the total mass of the positive electrode active material layer 12 is within the above range, excellent effect is achieved in terms of reducing the impedance of the non-aqueous electrolyte secondary battery.

As a method for obtaining the measurement target, for example, the following method can be adopted.

When the current collector coating layer 15 is not present on the positive electrode current collector main body 14 and only the positive electrode active material layer 12 is present on the positive electrode current collector main body 14, first, the positive electrode 1 is punched to obtain a piece having a predetermined size, and the layer (powder) present on the positive electrode current collector main body 14 is completely detached from the obtained piece by a method that immerses the piece in a solvent (for example N-methylpyrrolidone) and stirs the resulting. Next, after confirming that no powder remains attached to the positive electrode current collector main body 14, the positive electrode current collector main body 14 is taken out from the solvent to obtain a suspension (slurry) containing the detached powder and the solvent. The obtained suspension is dried at 120° C. to completely volatilize the solvent to obtain the desired measurement target (powder).

When the current collector coating layer 15 and the positive electrode active material layer 12 are present on the positive electrode current collector main body 14, the measurement target to be used is a dried product (powder) obtained by detaching only the powder constituting the positive electrode active material layer 12 and vacuum drying the powder in an environment of 120° C. For example, the measurement target may be one obtained by detaching the outermost surface of the positive electrode active material layer with a depth of several μm using a spatula or the like, and vacuum drying the resulting powder in an environment of 120° C.

The positive electrode 1 preferably has a conductive carbon content of 0.5 to 5.0% by mass, more preferably 1.0 to 3.5% by mass, even more preferably 1.0 to 2.5% by mass, with respect to the mass of the positive electrode 1 excluding the positive electrode current collector main body 14.

When this conductive carbon content is within the above range, excellent effect is achieved in terms of reducing the impedance of the non-aqueous electrolyte secondary battery.

When the positive electrode 1 is composed of the positive electrode current collector main body 14 and the positive electrode active material layer 12, the mass of the positive electrode 1 excluding the positive electrode current collector main body 14 is the mass of the positive electrode active material layer 12.

When the positive electrode 1 is composed of the positive electrode current collector main body 14, the current collector coating layer 15, and the positive electrode active material layer 12, the mass of the positive electrode 1 excluding the positive electrode current collector main body 14 is the sum of the mass of the current collector coating layer 15 and the mass of the positive electrode active material layer 12.

The amount of the conductive carbon with respect to the mass of the positive electrode 1 excluding the positive electrode current collector main body 14 can be measured by <<Method for measuring conductive carbon content>> described below with respect to a dried product (powder), as a measurement target, obtained by detaching the whole of a layer present on the positive electrode current collector main body 14, collecting the whole of substance resulting from the detached layer, and vacuum-drying the collected substance at 120° C. The particle size of the dried powder as the measurement target is not particularly limited as long as the conductive carbon content can be appropriately measured by the method described below.

<<Method for Measuring Conductive Carbon Content>>
(Measurement Method A)

A sample having a weight w1 is taken from a homogeneously mixed product of the measurement target, and the sample is subjected to thermogravimetry-differential thermal analysis (TG-DTA) implemented by following step A1 defined below, to obtain a TG curve. From the obtained TG curve, the following first weight loss amount M1 (unit: % by mass) and second weight loss amount M2 (unit: % by mass) are obtained. By subtracting M1 from M2, the conductive carbon content (unit: % by mass) is obtained. Step A1: A temperature of the sample is raised from 30° C. to 600° C. at a heating rate of 10° C./min and holding the temperature at 600° C. for 10 minutes in an argon gas stream of 300 mL/min to measure a resulting mass w2 of the sample, from which a first weight loss amount M1 is determined by formula (a1):

$$M1=(w1-w2)/w1\times100 \quad (a1)$$

Step A2: Immediately after the step A1, the temperature is lowered from 600° C. to 200° C. at a cooling rate of 10° C./min and held at 200° C. for 10 minutes, followed by completely substituting the argon gas stream with an oxygen gas stream. The temperature is raised from 200° C. to 1000° C. at a heating rate of 10° C./min and held at 1000° C. for 10 minutes in an oxygen gas stream of 100 mL/min to measure a resulting mass w3 of the sample, from which a second weight loss amount M2 (unit: % by mass) is calculated by formula (a2):

$$M2=(w1-w3)w1\times100 \quad (a2)$$

(Measurement Method B)

0.0001 mg of a precisely weighed sample is taken from a homogeneously mixed product of the measurement target, and the sample is burnt under burning conditions defined below to measure an amount of generated carbon dioxide by a CHN elemental analyzer, from which a total carbon content M3 (unit: % by mass) of the sample is determined. Also, a first weight loss amount M1 is determined following the procedure of the step A1 of the measurement method A. By subtracting M1 from M3, the conductive carbon content (unit: % by mass) is obtained.

(Burning Conditions)

Temperature of combustion furnace: 1150° C.
Temperature of reduction furnace: 850° C.
Helium flow rate: 200 mL/min.
Oxygen flow rate: 25 to 30 mL/min.

(Measurement Method C)

The total carbon content M3 (unit: % by mass) of the sample is measured in the same manner as in the above measurement method B. Further, the carbon amount M4 (unit: % by mass) of carbon derived from the binder is determined by the following method. M4 is subtracted from M3 to determine a conductive carbon content (unit: % by mass).

When the binder is polyvinylidene fluoride (PVDF: monomer ($CH_2CF_2$), molecular weight 64), the conductive carbon content can be calculated by the following formula from the fluoride ion (F) content (unit: % by mass) measured by combustion ion chromatography based on the tube combustion method, the atomic weight (19) of fluorine in the monomers constituting PVDF, and the atomic weight (12) of carbon in the PVDF.

PVDF content (unit: % by mass)=fluoride ion content (unit: % by mass)×64/38 PVDF-derived carbon amount M4 (unit: % by mass)=fluoride ion content (unit: % by mass)×12/19

The presence of polyvinylidene fluoride as a binder can be verified by a method in which a sample or a liquid obtained by extracting a sample with an N,N-dimethylformamide (DMF) solvent is subjected to Fourier transform infrared spectroscopy (FT-IR) to confirm the absorption attributable to the C—F bond. Such verification can be also implemented by 19F-NMR measurement.

When the binder is identified as being other than PVDF, the carbon amount M4 attributable to the binder can be calculated by determining the amount (unit: % by mass) of the binder from the measured molecular weight, and the carbon content (unit: % by mass).

These methods are described in the following publications:

Toray Research Center. The TRC News No. 117 (September 2013). pp. 34-37, [Searched on Feb. 10, 2021], Internet <https://www.toray-research.co.jp/technical-info/trcnews/pdf/TRC117(34-37).pdf>

TOSOH Analysis and Research Center Co., Ltd., Technical Report No. T1019 Sep. 20, 2017, Searched on Feb. 10, 20211, Internet <http//www.tosoh-arc.co.jp/techrepo/files/tarc00522/T1719N.pdf>

<<Analytical Method for Conductive Carbon>>

The conductive carbon in the coated section of the positive electrode active material and the conductive carbon as the conducting agent can be distinguished by the following analytical method.

For example, particles in the positive electrode active material layer are analyzed by a combination of transmission electron microscopy-electron energy loss spectroscopy (TEM-EELS), and particles having a carbon-derived peak around 290 eV only near the particle surface can be judged to be the positive electrode active material. On the other hand, particles having a carbon-derived peak inside the particles can be judged to be the conducting agent. In this context. "near the particle surface" means a region to the depth of approximately 100 nm from the particle surface, while "inside" means an inner region positioned deeper than the "near the particle surface".

As another method, the particles in the positive electrode active material layer are analyzed by Raman spectroscopy mapping, and particles showing carbon-derived G-band and D-band as well as a peak of the positive electrode active material-derived oxide crystals can be judged to be the positive electrode active material. On the other hand, particles showing only G-band and D-band can be judged to be the conducting agent.

As still another method, a cross section of the positive electrode active material layer is observed with scanning spread resistance microscope (SSRM). When the particle surface has a region with lower resistance than the inside of the particle, the region with lower resistance can be judged to be the conductive carbon present in the coated section of the active material. Other particles that are present isolatedly and have low resistance can be judged to be the conducting agent.

In this context, a trace amount of carbon considered to be an impurity and a trace amount of carbon unintentionally detached from the surface of the positive electrode active material during production are not judged to be the conducting agent.

Using any of these methods, it is possible to verify whether or not the conducting agent formed of carbon material is contained in the positive electrode active material layer.

In the present embodiment, the mass of the positive electrode active material layer 12 per unit area is preferably 20 to 100 mg/cm$^2$, and more preferably 30 to 50 mg/cm$^2$.

In the context of the present specification, the mass per unit area of the positive electrode active material layer is a total value for the positive electrode active material layers present on both surfaces of the positive electrode current collector unless otherwise specified.

The mass per unit area of the positive electrode active material layer 12 can be measured by, for example, the following measuring method.

The mass of the measurement sample punched out from the positive electrode so as to have a predetermined area is measured, from which the mass of the positive electrode current collector 11 measured in advance is subtracted to calculate the mass of the positive electrode active material layer.

From the ratio: mass of positive electrode active material layer (unit: mg)/area of measurement sample (unit: cm$^2$), the mass the positive electrode active material layer 12 per unit area (unit: mg/cm$^2$) is determined.

When the mass of the positive electrode active material layer 12 per unit area is not less than the lower limit of the above range, excellent effect of improving the gravimetric energy density is achieved. When the mass of the positive electrode active material layer 12 per unit area is not more than the upper limit of the above range, excellent effect of reducing the impedance of the non-aqueous electrolyte secondary battery is achieved.

The mass of the positive electrode active material layer 12 per unit area can be controlled, for example, by adjusting the coating amount of the positive electrode composition.

In the present embodiment, the powder resistivity of the positive electrode active material layer 12 is 10 to 1,000 Ω·cm, preferably 15 to 100 Ω·cm, and more preferably 20 to 50 Ω·cm.

In the context of the present specification, the powder resistivity of the positive electrode active material layer 12 is a value measured with respect to a dried product, as a measurement target, obtained by detaching the positive electrode active material layer 12 present on the positive electrode current collector 11 with a spatula, etc., to obtain a sample (particles), and vacuum-drying the obtained sample.

When the powder resistivity of the positive electrode active material layer 12 is not less than the lower limit of the above range, the amounts of the conductive carbon and the binder are presumably optimized, leading to excellent effect of improving the energy density of the non-aqueous electrolyte secondary battery. When the powder resistivity is not more than the upper limit, excellent effect of reducing the impedance of the non-aqueous electrolyte secondary battery is achieved.

The powder resistivity can be adjusted, for example, by the type of the positive electrode active material, the amount of the conducting agent, and the like. With the same type of the positive electrode active material, as the amount of the conducting agent is decreased, the powder resistivity increases.

In the present embodiment, the peel strength of the positive electrode active material layer 12 is preferably 10 to 1,000 mN/cm, more preferably 20 to 500 mN/cm, and even more preferably 50 to 300 mN/cm.

In the context of the present specification, the peel strength of the positive electrode active material layer 12 is the 1800 peel strength obtained by the measuring method described in the Examples section described below.

When the peel strength of the positive electrode active material layer 12 is not less than the lower limit value of the above range, excellent binding is achieved between the particles forming the positive electrode active material layer 12, and excellent adhesion is achieved between the positive electrode current collector 11 and the positive electrode active material layer 12. When the peel strength is not more than the upper limit of the above range, the amounts of the conductive carbon and the binder are presumably optimized, leading to excellent effect of improving the energy density of the non-aqueous electrolyte secondary battery.

The peel strength can be controlled by, for example, adjusting the amounts of the binder and the conducting agent. The larger the amount of the binder, the higher the peel strength. By reducing the amount of the conducting agent, which has a large surface area and requires more binder than the active material, the amount of binder required to obtain satisfactory peel strength can be reduced.

<Non-Aqueous Electrolyte Secondary Battery>

The non-aqueous electrolyte secondary battery 10 of the present embodiment shown in FIG. 2 includes a positive electrode 1 of the present embodiment, a negative electrode 3, and a non-aqueous electrolyte. Further, a separator 2 may be provided. Reference numeral 5 in FIG. 1 denotes an outer casing.

In the present embodiment, the positive electrode 1 has a plate-shaped positive electrode current collector 11 and positive electrode active material layers 12 provided on both surfaces thereof. The positive electrode active material layer 12 is present on a part of each surface of the positive electrode current collector 11. The edge of the surface of the positive electrode current collector 11 is an exposed section 13 of the positive electrode current collector, which is free of the positive electrode active material layer 12. A terminal tab (not shown) is electrically connected to an arbitrary portion of the exposed section 13 of the positive electrode current collector.

The negative electrode 3 has a plate-shaped negative electrode current collector 31 and negative electrode active material layers 32 provided on both surfaces thereof. The negative electrode active material layer 32 is present on a part of each surface of the negative electrode current collector 31. The edge of the surface of the negative electrode current collector 31 is an exposed section 33 of the negative electrode current collector, which is free of the negative electrode active material layer 32. A terminal tab (not shown) is electrically connected to an arbitrary portion of the exposed section 33 of the negative electrode current collector.

The shapes of the positive electrode 1, the negative electrode 3 and the separator 2 are not particularly limited. For example, each of these may have a rectangular shape in a plan view.

With regard to the production of the non-aqueous electrolyte secondary battery 10 of the present embodiment, for example, the production can be implemented by a method in which the positive electrode 1 and the negative electrode 3 are alternately interleaved through the separator 2 to produce an electrode layered body, which is then packed into an outer casing such as an aluminum laminate bag, and a non-aqueous electrolyte (not shown) is injected into the outer casing, followed by sealing the outer casing. FIG. 2 shows a representative example of a structure of the battery in which the negative electrode, the separator, the positive electrode, the separator, and the negative electrode are stacked in this order, but the number of electrodes can be altered as appropriate. The number of the positive electrode 1 may be one or more, and any number of positive electrodes 1 can be used depending on a desired battery capacity. The number of each of the negative electrode 3 and the separator 2 is larger by one sheet than the number of the positive electrode 1, and these are stacked so that the negative electrode 3 is located at the outermost layer.

(Negative Electrode)

The negative electrode active material layer 32 includes a negative electrode active material. Further, the negative electrode active material layer 32 may further include a binder. Furthermore, the negative electrode active material layer 32 may include a conducting agent as well. The shape of the negative electrode active material is preferably particulate.

For example, the negative electrode 3 can be produced by a method in which a negative electrode composition containing a negative electrode active material, a binder and a solvent is prepared, and coated on the negative electrode current collector 31, followed by drying to remove the solvent to thereby form a negative electrode active material layer 32. The negative electrode composition may contain a conducting agent.

Examples of the negative electrode active material and the conducting agent include carbon materials such as carbon black (e.g., Ketjen black, and acetylene black), graphite, graphene, hard carbon, and carbon nanotube (CNT). With respect to each of the negative electrode active material and the conducting agent, a single type thereof may be used alone or two or more types thereof may be used in combination.

Examples of the material of the negative electrode current collector 31, the binder and the solvent in the negative electrode composition include those listed above as examples of the material of the positive electrode current collector 11, the binder and the solvent in the positive electrode composition. With respect to each of the binder and the solvent in the negative electrode composition, a single type thereof may be used alone or two or more types thereof may be used in combination.

The sum of the amount of the negative electrode active material and the amount of the conducting agent is preferably 80.0 to 99.9% by mass, and more preferably 85.0 to 98.0% by mass, based on the total mass of the negative electrode active material layer 32.

(Separator)

The separator 2 is disposed between the negative electrode 3 and the positive electrode 1 to prevent a short circuit or the like. The separator 2 may retain a non-aqueous electrolyte described below.

The separator 2 is not particularly limited, and examples thereof include a porous polymer film, a non-woven fabric, and glass fiber.

An insulating layer may be provided on one or both surfaces of the separator 2. The insulating layer is preferably a layer having a porous structure in which insulating fine particles are bonded with a binder for an insulating layer.

The separator 2 may contain various plasticizers, antioxidants, and flame retardants.

Examples of the antioxidant include phenolic antioxidants such as hindered-phenolic antioxidants, monophenolic antioxidants, bisphenolic antioxidants, and polyphenolic antioxidants; hinderedamine antioxidants; phosphorus antioxidants; sulfur antioxidants; benzotriazole antioxidants; benzophenone antioxidants; triazine antioxidants; and salicylate antioxidants. Among these, phenolic antioxidants and phosphorus antioxidants are preferable.

(Non-Aqueous Electrolyte)

The non-aqueous electrolyte fills the space between the positive electrode 1 and the negative electrode 3. For example, any of known non-aqueous electrolytes used in lithium ion secondary batteries, electric double layer capacitors and the like can be used.

As the non-aqueous electrolyte, a non-aqueous electrolyte solution in which an electrolyte salt is dissolved in an organic solvent is preferable.

The organic solvent is preferably one having tolerance to high voltage. Examples of the organic solvent include polar solvents such as ethylene carbonate, propylene carbonate, dimethyl carbonate, diethyl carbonate, ethyl methyl carbonate, γ-butyrolactone, sulfolane, dimethyl sulfoxide, acetonitrile, dimethylformamide, dimethylacetamide, 1,2-dimethoxyethane, 1,2-diethoxyethane, tetrahydrofuran, 2-methyltetrahydrofuran, dioxolane, and methyl acetate, as well as mixtures of two or more of these polar solvents.

The electrolyte salt is not particularly limited, and examples thereof include lithium-containing salts such as $LiClO_4$, $LiPF_6$, $LiBF_4$, $LiAsF_6$, $LiCF_6$, $LiCF_3CO_2$, $LiPF_6SO_3$, $LiN(SO_2F)_2$, $LiN(SO_2CF_3)_2$, $Li(SO_2CF_2CF_3)_2$, $LiN(COCF_3)_2$, and $LiN(COCF_2CF_3)_2$, as well as mixture of two or more of these salts.

The non-aqueous electrolyte secondary battery of the present embodiment can be used as a lithium ion secondary battery for various purposes such as industrial use, consumer use, automobile use, and residential use.

The application of the non-aqueous electrolyte secondary battery of this embodiment is not particularly limited. For example, the battery can be used in a battery module configured by connecting a plurality of non-aqueous electrolyte secondary batteries in series or in parallel, a battery system including a plurality of electrically connected battery modules and a battery control system, and the like.

Examples of the battery system include battery packs, stationary storage battery systems, automobile power storage battery systems, automobile auxiliary storage battery systems, emergency power storage battery systems, and the like.

According to the present embodiment, a non-aqueous electrolyte secondary battery having an excellent gravimetric energy density can be obtained. For example, a gravimetric energy density of 120 Wh/kg or more, preferably 130 Wh/kg or more, and more preferably 140 Wh/kg or more can be achieved.

Further, in the present invention, the features of the first embodiment, the second embodiment and the third embodiment described above can be appropriately combined. Specifically, the present invention further provides the following embodiments.

[D1] A positive electrode for a non-aqueous electrolyte secondary battery, including a positive electrode current collector and a positive electrode active material layer provided on the positive electrode current collector, wherein at least one of (D1-1), (D1-2) and (D1-3) below are satisfied:

(D1-1) the positive electrode active material layer includes positive electrode active material particles, and a spreading resistance distribution of the positive electrode active material layer shows a profile with a sum of frequencies of resistance values in a range of 4.0 to 6.0 (log $\Omega$) accounting for 0.0 to 5.0%, preferably 0.0 to 4.0%, more preferably 0.0 to 3.0%, even more preferably 0.0 to 2.0%, relative to a total, 100%, of frequencies of resistance values in a range of 4.0 to 12.5 (log $\Omega$);

(D1-2) the positive electrode active material layer includes a positive electrode active material and a conductive carbon material, and an amount of a low-resistance conductive carbon material having a resistivity of 0.10 $\Omega$·cm or less is 0.5% by mass or less, preferably 0.3% by mass or less, more preferably 0.2% by mass or less, even more preferably 0.1% by mass or less, based on a total mass of the positive electrode active material layer; and (D1-3) the positive electrode active material layer includes a positive electrode active material, and the positive electrode active material has, on at least a part of its surface, a coated section including a conductive material; and the positive electrode active material layer has a powder resistivity of 10 to 1,000 $\Omega$·cm, preferably 15 to 100 $\Omega$·cm, more preferably 20 to 50 $\Omega$·cm.

[D2] The positive electrode according to [D1], wherein an average frequency B (%) of the resistance values in a range of 6.0 to 9.0 (log $\Omega$) is larger than an average frequency A (%) of the resistance values in a range of 4.0 to 6.0 (log $\Omega$) in the spreading resistance distribution (that is, A<B), and a difference (B−A) between the average frequency A and the average frequency B is preferably more than 0%, more preferably 0.05% or more, and even more preferably 0.20%.

[D3] The positive electrode according to [D1] or [D2], wherein the positive electrode active material layer further includes a conducting agent, which is preferably at least one carbon material selected from the group consisting of graphite, graphene, hard carbon, Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, relative to 100 parts by mass of the positive electrode active material.

[D4] The positive electrode according to [D3], wherein the positive electrode active material particles have, on at least a part of surfaces thereof, a coated section including a conductive material.

[D5] The positive electrode according to [D1] or [D2], wherein the positive electrode active material layer does not contain a conducting agent, and the positive electrode active material particles have, on at least a part of surfaces thereof, a coated section including a conductive material.

[D6] The positive electrode according to anyone of [D3] to [D5], wherein the positive electrode active material layer includes a conductive carbon, and an amount of the conductive carbon is 0.5% by mass or more and less than 3.0% by mass, preferably 1.0 to 2.8% by mass, more preferably 1.3 to 2.5% by mass, based on a total mass of the positive electrode active material layer.

[D7] The positive electrode active material according to any one of [D1] to [D6], wherein the positive electrode active material includes a compound represented by a formula LiFexM$_{(1-x)}$PO$_4$, wherein 0≤x≤1, M is Co, Ni, Mn, Al, Ti or Zr, and the compound is preferably lithium iron phosphate represented by LiFePO$_4$.

[D8] The positive electrode according to any one of [D1] to [D7], wherein a current collector coating layer including a conductive material is present on at least a part of a surface of the positive electrode current collector on a side of the positive electrode active material layer, and an area of a section of the surface, on which the current collector coating layer is present, is preferably 10% to 100%, more preferably 30% to 100%, even more preferably 50% to 100%, based on a total area of the surface.

[D9] The positive electrode according to any one of [D1] to [D8], wherein an amount of a low-resistance conductive carbon material having a resistivity of 0.02 $\Omega$·cm or less is 0.5% by mass or less, preferably 0.3% by mass or less, more preferably 0.2% by mass or less, particularly preferably 0.1% by mass or less, based on a total mass of the positive electrode active material layer.

[D10] The electrode according to [D1] or [D9], wherein:

the positive electrode active material layer includes particle main bodies consisting of the positive electrode active material, and a coating section present on at least a part of surface of each of the particle main bodies; and at least a part of the conductive carbon material forms the coating section, and a resistivity of the coating section is 0.15 $\Omega$·cm or more, preferably 0.15 $\Omega$·cm to 1.0 $\Omega$·cm, more preferably 0.20 $\Omega$·cm to 0.5 $\Omega$·cm, even more preferably 0.25 $\Omega$·cm to 0.4 $\Omega$·cm.

[D11] The positive electrode to [D10], wherein an amount of the coating section is 0.9% by mass or more, preferably 1.0% by mass or more, more preferably 1.1% by mass or more, based on a total mass of the positive electrode active material layer.

[D12] The positive electrode according to any one of [D1] to [D11], wherein the positive electrode active material layer further includes a conducting agent, which is preferably at least one carbon material selected from the group consisting of graphite, graphene, hard carbon. Ketjen black, acetylene black, and carbon nanotube (CNT), wherein an amount of the conducting agent in the positive electrode active material layer is preferably 4 parts by mass or less, more preferably 3 parts by mass or less, even more preferably 1 part by mass or less, based on a total mass of the positive electrode active material layer.

[D13] The positive electrode according to any one of [D1] to [D12], wherein the positive electrode active material layer includes a binder, and an amount of the binder is 0.1 to 1.0% by mass, preferably 0.3 to 0.8% by mass, based on a total mass of the positive electrode active material layer.

[D14] The positive electrode according to [D13], wherein the binder includes polyvinylidene fluoride.

[D15] The positive electrode according to any one of [D1] to [D14], wherein the positive electrode active material layer has a peel strength of 10 to 1,000 mN/cm, preferably 20 to 500 mN/cm, and more preferably 50 to 300 mN/cm.

[D16] The positive electrode according to any one of [D1] to [D15], wherein the positive electrode active material layer is present on both surfaces of the positive electrode current collector, and a total mass per unit area of the positive electrode active material layer on the both surfaces is 20 to 100 mg/cm$^2$, preferably 30 to 50 mg/cm$^2$.

[D17] The positive electrode according to any one of [D1] to [D16], wherein a current collector coating layer is present on a surface of the positive electrode current collector on a side of the positive electrode active material layer.

[D18] The positive electrode according to [D17], wherein the current collector coating layer includes carbon, and preferably includes carbon particles (such as carbon black) and a binder.

[D19] The positive electrode according to any one of [D1] to [D18], wherein the conductive material includes carbon, and is preferably composed only of carbon, with the proviso that an amount of the conductive material is preferably 0.1 to 3.0% by mass, and more preferably 0.5 to 1.5% by mass, and even more preferably 0.7 to 1.3% by mass, based on a total mass of the positive electrode active material including the coated section.

[D20] The electrode according to any one of [D1], [D2], [D7] to [D11], and [D13] to [D19], wherein the positive electrode active material layer does not contain a conducting agent.

[D21] A non-aqueous electrolyte secondary battery, including the positive electrode of any one of [D1] to [D20], a negative electrode, and a non-aqueous electrolyte disposed between the positive electrode and the negative electrode.

[D22] The non-aqueous electrolyte secondary battery according to [D21], which has a gravimetric energy density of 120 Wh/kg or more, preferably 130 Wh/kg or more, more preferably 140 Wh/kg or more.

[D23] A battery module or battery system including a plurality of the non-aqueous electrolyte secondary batteries of [D21] or [D22].

EXAMPLES

Hereinbelow, the present invention will be described with reference to Examples which, however, should not be construed as limiting the present invention.

<Measuring Method>
(Spreading Resistance Distribution)

With respect to a cross section parallel to the thickness direction of the positive electrode active material layer as a measurement target, the spreading resistance distribution was measured under the following conditions using SSRM.

(Measuring instrument used) Product name: NanoSpeceV DivisionIcon, Glovebox, manufactured by Made by Bruker Corporation.

(Preparation of sample) A test piece cut out from the positive electrode sheet was embedded in an epoxy resin and then cut by broad ion beam processing to obtain a cross section. The resulting was introduced into the measuring instrument under an inert atmosphere.

(Measurement Conditions)

Scanning mode: Simultaneous measurement of contact mode and spreading resistance.

Probe (tip): Diamond-coated silicon cantilever (DDESS 10).

Measurement environment: Room temperature, high-purity Ar gas atmosphere ($H_2O$=0.1 ppm, $O_2$=0.1 ppm).

Applied voltage: DC bias voltage=+2.0 V.

Scan size: 60 μm×60 μm.

Number of measurement points (number of data points): 1024×1024.

(Volume Density Measuring Method)

The thickness of the positive electrode sheet and the thickness of the positive electrode current collector at its exposed section were measured using a micrometer. Each thickness was measured at S arbitrarily chosen points, and an average value was calculated. The thickness of the positive electrode active material layer was calculated by subtracting the thickness of the exposed section of the positive electrode current collector from the thickness of the positive electrode sheet.

5 sheets of measurement samples were prepared by punching the positive electrode sheet into circles with a diameter of 16 mm.

The mass of each measurement sample was weighed with a precision balance, and the mass of the positive electrode active material layer in the measurement sample was calculated by subtracting the mass of the positive electrode current collector measured in advance from the measurement result. The volume density of the positive electrode active material layer was calculated from the average value of measured values by the above formula (1).

<Evaluation Method>
(Evaluation of Heat Resistance: Measurement of Output Retention)

(1) For a non-aqueous electrolyte secondary battery (initial state), the power (unit: Wh) that can be initially output was measured by the following method.

A non-aqueous electrolyte secondary battery (cell) was prepared to as to have a rated capacity would be 1.5 Ah. In an environment of 25° C. the obtained cell was charged at a constant current rate of 0.2 C (that is, 300 mA) and with a cut-off voltage of 3.6 V, and then charged at a constant voltage with a cut-off current set at 1/10 of the above-mentioned charge current (that is, 30 mA).

Then, in an environment of 25° C. the cell was discharged at a constant current rate of 1.0 C rate (that is, 1500 mA) and with a cut-off voltage of 3.0 V. The discharge power at this time was defined as the power that can be output in the initial state (hereinbelow, also referred to as "initial output") E1.

(2) Then, in an environment of 25° C. the cell was discharged at the cell's 0.2 C (that is, 300 mA) and with a cut-off voltage of 3.6 V, and then charged at a constant voltage with a cut-off current set at 1/10 of the above-mentioned charge current (that is, 30 mA) so as to have the cell reach a fully charged state.

(3) The non-aqueous electrolyte secondary battery after the measurement in (1) and the adjustment to full charge in (2) was stored in an atmosphere of 80° C. for 20 days.

(4) After the storage period of the above (3), the power (unit: Wh) that can be output after the storage was measured by the following method.

First, in an environment of 25° C. the cell was discharged at a constant current rate of 0.2 C (that is, 300 mA) and with a cut-off voltage of 2.5 V.

Then, in an environment of 25° C. the cell was charged at a constant current rate of 0.2 C (that is, 300 mA) and with a cut-off voltage of 3.6 V, and then charged at a constant voltage with a cut-off current set at 1/10 of the above-mentioned charge current (that is, 30 mA).

Then, in an environment of 25° C., the cell was discharged at a constant current rate of 1.0 C rate (that is, 1500 mA) and with a cut-off voltage of 3.0 V. The discharge power at this time was defined as the power that can be output after the storage (hereinbelow, also referred to as "post-storage output") E2.

(5) The ratio of the post-storage output E2 obtained in (4) to the initial output E1 obtained in (1) was calculated by the following formula to obtain an output retention (unit: %).

Output retention=(E2/E1)×100

Production Example 1: Production of Negative Electrode 100 parts by mass of artificial graphite as a negative electrode active material, 1.5 parts by mass of styrene-butadiene rubber as a binder, 1.5 parts by mass of carboxymethyl cellulose Na as a thickener, and water as a solvent were mixed, to thereby obtain a negative electrode composition having a solid content of 50% by mass.

The obtained negative electrode composition was applied onto both sides of a copper foil (thickness 8 μm) and vacuum dried at 100° C. Then, the resulting was pressure-pressed under a load of 2 kN to obtain a negative electrode sheet. The mass per unit area of the negative electrode active material layer was measured by the above method. The results are shown in Table 5.

The obtained negative electrode sheet was punched to obtain a negative electrode.

Production Example 2: Production of Current Collector Having Current Collector Coating Layer A slurry was obtained by mixing 100 parts by mass of carbon black, 40 parts by mass of polyvinylidene fluoride as a binder, and N-methylpyrrolidone (NMP) as a solvent. The amount of NMP used was the amount required for applying the slurry.

The obtained slurry was applied to both sides of a 15 μm-thick aluminum foil (positive electrode current collector main body) by a gravure method so as to allow the resulting current collector coating layers after drying (total of layers on both sides) to have a thickness of 2 μm, and dried to remove the solvent, thereby obtaining a positive electrode current collector. The current collector coating layers on both surfaces were formed so as to have the same amount of coating and the same thickness.

Examples A1 to A5

Examples A1 to A3 are implementation of the present invention, while Examples A4 and A5 are comparative examples.

As the positive electrode active material particles, the following two types of lithium iron phosphate particles having a coated section (hereinafter, also referred to as "carbon-coated active material") were used.

Carbon-coated active material (1): average particle diameter 1 μm, carbon content 1.5% by mass.

Carbon-coated active material (2): average particle diameter 10 μm, carbon content 2.5% by mass.

In both of the carbon-coated active materials (1) and (2), the thickness of the coated section was in the range of 1 to 100 nm.

Carbon black (CB) or carbon nanotube (CNT) was used as the conducting agent. Impurities in the CB and the CNT are below the quantification limit; therefore, both of the CB and the CNT can be regarded as having a carbon content of 100% by mass.

Polyvinylidene fluoride (PVDF) was used as a binder.
N-methylpyrrolidone (NMP) was used as a solvent.

As a positive electrode current collector, the aluminum foil having the current collector coating layer obtained in Production Example 2 was used.

A positive electrode active material layer was formed by the following method.

With the blending ratio shown in Table 1, the positive electrode active material particles, the conducting agent, the binder, and the solvent (NMP) were mixed with a mixer to obtain a positive electrode composition. The amount of the solvent used was the amount required for applying the positive electrode composition. The blending amounts of the positive electrode active material particles, the conducting agent and the binder in the table are percentage values relative to the total 100% by mass excluding the solvent (that is, the total amount of the positive electrode active material particles, the conducting agent and the binder).

The obtained positive electrode composition was applied to both surfaces of the positive electrode current collector, and after pre-drying, the applied composition was vacuum-dried at 120° C. to form positive electrode active material layers. The obtained laminate was pressure-pressed to obtain a positive electrode sheet. Table 1 shows the coating amount (total for both surfaces), the thickness of the positive electrode active material layer (total for both surfaces), and the volume density. The positive electrode active material layers on both surfaces of the positive electrode current collector were formed so as to have the same coating amount and the same thickness.

The obtained positive electrode sheet was punched to obtain a positive electrode.

With respect to the obtained positive electrode sheet, the spreading resistance distribution of cross section of the positive electrode active material layer was measured by the above method, and the values of the respective items shown in Tables 2 were obtained.

Further, the conductive carbon content with respect to the total mass of the positive electrode active material layer was determined. The results are shown in Table 2.

Figure 3:
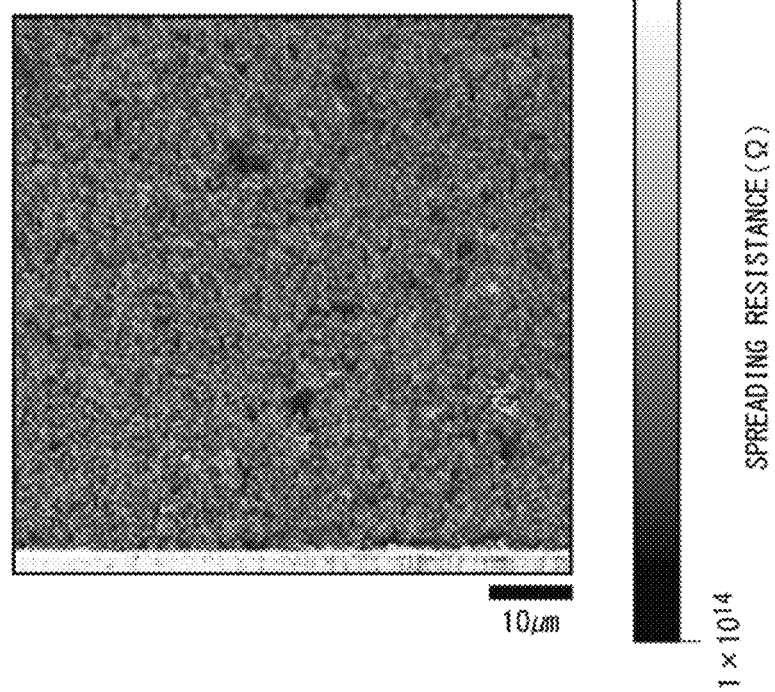
FIG. 3 is a mapping image showing a measurement result of spreading resistance distribution.
Figure 4:
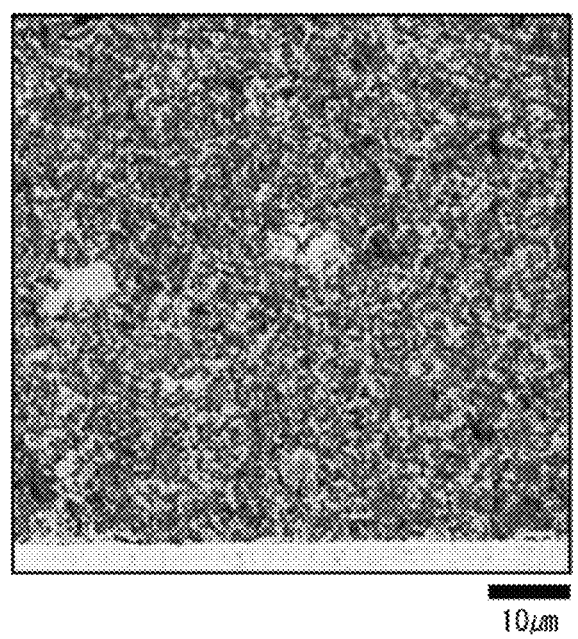
FIG. 4 is a mapping image showing a measurement result of spreading resistance distribution.
Figure 4:
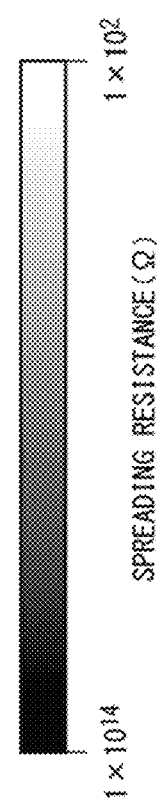
Figure 5:
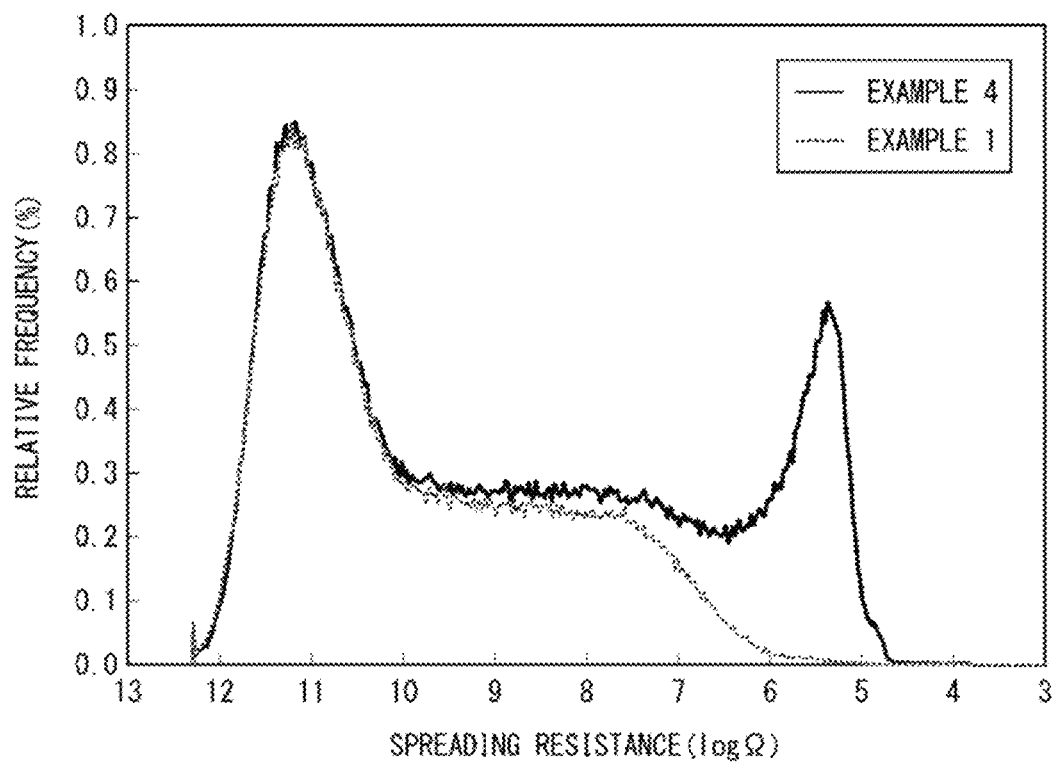
FIG. 5 is a graph showing a measurement result of spreading resistance distribution.

FIG. 3 is a mapping image showing a measurement result of spreading resistance distribution in Example A1, and FIG. 4 is a mapping image showing a measurement result of spreading resistance distribution in Example A4. FIG. 5 is a graph showing the spreading resistance distribution in Examples A1 and A3 with its abscissa indicating spreading resistance (unit: log Ω) and its ordinate indicating relative frequency (unit: %) with respect to the total 100% of frequency of resistance values in the range of 4.0 to 12.5 (log Ω).

The conductive carbon content with respect to the total mass of the positive electrode active material layer was calculated based on the carbon content and blending amount of the carbon-coated active material as well as the carbon content and blending amount of the conducting agent. The conductive carbon content can also be confirmed by the <<Method for measuring conductive carbon content>> described above.

A non-aqueous electrolyte secondary battery having a configuration shown in FIG. 2 was manufactured by the following method.

LiPF$_6$ as an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in this example and the negative electrode obtained in Production Example 1 were alternately interleaved through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-sealed to manufacture a non-aqueous electrolyte secondary battery (laminate cell).

The output retention after high temperature storage was measured by the above method to evaluate the heat resistance. The results are shown in Table 2.

TABLE 1

| | POSITIVE ELECTRODE COMPOSITION | | | | | POSITIVE ELECTRODE ACTIVE MATERIAL LAYER | | |
|---|---|---|---|---|---|---|---|---|
| | POSITIVE ELECTRODE ACTIVE MATERIAL PARTICLES | | CONDUCTING AGENT | | BINDER | COATING AMOUNT (TOTAL FOR BOTH SURFACES) | THICKNESS (TOTAL FOR BOTH SURFACES) | VOLUME DENSITY |
| | TYPE | AMOUNT (% BY MASS) | TYPE | AMOUNT (% BY MASS) | AMOUNT (% BY MASS) | SOLVENT AMOUNT | | |
| | | | | | | | mg/cm$^2$ | μm | g/cm$^3$ |
| Ex. 1 | CARBON-COATED ACTIVE MATERIAL(1) | 99.5 | — | 0.0 | 0.5 | REQUIRED AMOUNT | 33.0 | 143 | 2.31 |
| Ex. 2 | CARBON-COATED ACTIVE MATERIAL(2) | 99.5 | — | 0.0 | 0.5 | | 33.0 | 143 | 2.31 |
| Ex. 3 | CARBON-COATED ACTIVE NATERIAL(1) | 98.5 | CNT | 0.5 | 1.0 | | 33.3 | 144 | 2.31 |
| Ex. 4 | CARBON-COATED ACTIVE MATERIAL(1) | 93.5 | CB | 5.0 | 1.5 | | 35.1 | 160 | 2.19 |
| Ex. 5 | CARBON-COATED ACTIVE NATERIAL(1) | 97.0 | CB | 2.0 | 1.0 | | 33.9 | 148 | 2.29 |

TABLE 2

| | SUM OF FREQUENCIES FOR 4.0 TO 6.0 (logΩ) | AVERAGE FREQUENCY A FOR 4.0 TO 6.0 (logΩ) | AVERAGE FREQUENCY B FOR 6.0 TO 9.0 (logΩ) | A VS. B | CONDUCTIVE CARBON CONTENT | EVALUATION OF HEAT RESISTANCE | | |
|---|---|---|---|---|---|---|---|---|
| | | | | | | INITIAL OUTPUT | OUTPUT AFTER STORAGE AT 80° C. FOR 20 DAYS | OUTPUT RETENTION |
| UNIT | % | % | % | — | % BY MASS | Wh | Wh | % |
| Ex. 1 | 0.5 | 0.009 | 0.177 | A < B | 1.5 | 4.5 | 3.0 | 67 |
| Ex. 2 | 0.3 | 0.004 | 0.333 | A < B | 2.5 | 4.4 | 3.2 | 73 |
| Ex. 3 | 3.5 | 0.184 | 0.261 | A < B | 2.0 | 4.6 | 3.0 | 65 |
| Ex. 4 | 15.9 | 0.389 | 0.250 | A > B | 6.5 | 4.5 | 0.05 | 1.1 |
| Ex. 5 | 7.8 | 0.301 | 0.281 | A > B | 3.5 | 4.6 | 0.11 | 2.4 |

As can be understood from the results shown in Table 2, in Examples A1 to A3 where the section with resistance values in the range of 4.0 to 6.0 (log Ω) in the cross section of the positive electrode active material layer was as small as 5.0% or less, the output retention was high even after storage in a high temperature environment, so that the heat resistance was satisfactory. Presumably, the increase in resistance was suppressed because the low-resistance portion, which easily deteriorates at high temperatures, was hardly present in the positive electrode active material layer.

Comparing Example A1 and Example A3, Example A1 containing no conducting agent had a lower sum of frequencies of resistance values in the range of 4.0 to 6.0 (log Ω), and showed higher output retention.

Example A2 is a modification of Example A1, in which the conductive carbon content was increased without increasing the amount of the conducting agent added. Compared to Example A1, the sum of frequencies of resistance values in the range of 4.0 to 6.0 (log Ω) was further decreased, the average frequency B (%) of the resistance values in the range of 6.0 to 9.0 (log Ω) was further increased, and the output retention was further improved.

On the other hand, in Examples A4 and A5 in which the sum of frequencies of resistance values in the range of 4.0 to 6.0 (log Ω) exceeded 5.0%, the output retention after storage in a high temperature environment was remarkably low as compared to Examples A1 to A3, indicating inferior heat resistance. As can be seen from the mapping image of FIG. 4, low-resistance portions are locally scattered in the positive electrode active material layer of Example A4. Such low resistance portions are presumed to have become active sites in a high temperature environment and allowed a deterioration reaction to occur.

<Evaluation Method>
(Method for Measuring Capacity Retention (Rapid Charge/Discharge Cycle Test))

A non-aqueous electrolyte secondary battery (cell) was manufactured so as to have a rated capacity of 1 Ah. The battery was charged at 3.5 C rate and 3.8 V, and a 10-second pause was provided. Then, the battery was discharged at 3.5 C rate and 2.0 V, and a 10-second pause was provided. This cycle of charge and discharge was repeated 1000 times. Then, the battery was discharged at 0.2 C rate and 2.5 V, and a discharge capacity B was measured. This discharge capacity B was divided by a discharge capacity A of the non-aqueous electrolyte secondary battery before being subjected to the charge/discharge cycle to obtain the cycle capacity retention (%).

A higher value of the cycle capacity retention indicates that deterioration is less likely to occur after the rapid charge/discharge cycle test, and a higher durability is achieved.

The cycle capacity retention is, for example, preferably 50% or higher, more preferably 55% or higher, and even more preferably 60% or higher.

Examples B1 to B6

Examples B1 to B4 are implementation of the present invention, while Examples B5 and B6 are comparative examples.

As the positive electrode active material particles, the following lithium iron phosphate particles having a coating section (hereinafter, also referred to as "carbon-coated active material") were used. The coating section of the active material was formed of a conductive carbon material and can be regarded as having a carbon content of 100% by mass. The following three types of carbon-coated active materials were prepared. Carbon-coated active material (1): particle main body 98.9% by mass, coating section 1.1% by mass. Carbon-coated active material (2): particle main body 97.8% by mass, coating section 2.2% by mass. Carbon-coated active material (3): particle main body 98.9% by mass, coating section 1.1% by mass. In all of the carbon-coated active materials (1) to (3), the thickness of the coating section was in the range of 1 to 100 nm. The carbon-coated active materials (1) to (3) differed from each other in terms of the resistivity of the coating section.

The following two types of the conducting agents were prepared.

Acetylene black (AB): true density $\rho^6 2.0$ g/cm$^3$, resistivity $R^4 0.016$ Ω·cm.

Carbon nanotube (CNT): true density $\rho^6 2.2$ g/cm$^3$, resistivity $R^4 0.005$ Ω·cm.

Impurities in the AB and the CNT are below the quantification limit; therefore, both of the AB and the CNT can be regarded as having a carbon content of 100% by mass.

The resistivity $R^4$ of each conducting agent was measured by the <<Method for measuring resistivity $R^4$ of conducting agent>> described above. The pressure applied for measuring the powder resistivity $R^3$ of the conducting agent was 12 MPa.

Polyvinylidene fluoride (PVDF) was used as a binder.
N-methylpyrrolidone (NMP) was used as a solvent.

As a positive electrode current collector, the aluminum foil having the current collector coating layer obtained in Production Example 2 was used.

(Production of Positive Electrode)

A positive electrode active material layer was formed by the following method.

The positive electrode active material particles, the conducting agent, the binder, and the solvent (NMP), which are shown in Table 3, were mixed with a mixer to obtain a positive electrode composition. The amount of the solvent used was the amount required for applying the positive electrode composition. The blending amount of the binder in the table is a percentage value relative to the total 100% by mass excluding the solvent (that is, the total amount of the positive electrode active material particles, the conducting agent and the binder).

The obtained positive electrode composition was applied to both surfaces of the positive electrode current collector, and after pre-drying, the applied composition was vacuum-dried at 120° C. to form positive electrode active material layers. The obtained laminate was pressure-pressed to obtain a positive electrode sheet. The positive electrode active material layers on both surfaces of the positive electrode current collector were formed so as to have the same coating amount and the same thickness. The coating amount (total for both surfaces) was 33 cm$^2$, and the thickness of the positive electrode active material layer (total for both surfaces) was 143 lim.

The obtained positive electrode sheet was punched to obtain a positive electrode.

With respect to the obtained positive electrode sheet, the resistivity $R^2$ of the coating section of the active material was measured by the <<Method for measuring resistivity $R^2$ of coating section of active material>> described above.

(i) A powder obtained by scraping off the positive electrode active material layer from the positive electrode current collector was used as a measurement target powder, and the powder resistivity $R^1$ and the mass density $\rho^1$ were measured by the <Method for measuring powder resistivity $R^1$> described above.

The measuring instrument used was a powder resistance measuring system (model number: MCP-PD51) manufactured by Nittoseiko Analytech, Co., Ltd, 2 g of the sample after vacuum drying was put into a measuring cell having a radius of 10 mm, and the powder resistivity (unit: Ω·cm) and the sample thickness under the application of a pressure of 50 MPa were measured. The measurement conditions were as follows: an electrode interval of 3 mm, an electrode radius of 0.7 mm, and a 4-pin probe. The number of samples was 3, and the average value was calculated. The obtained powder resistivity $R^1$ is shown in Table 3.

(ii) The amount $m^1$ of the coating section of the active material with respect to the total mass of the positive electrode active material layer was calculated based on the amount of the coating section of the carbon-coated active material and the amount of the material used for forming the coating section. The obtained $m^1$ is shown in Table 3.

The amount $m^1$ can also be confirmed by the <<Method for measuring conductive carbon content>> described above.

(iii) The volume ratio $Q^1$ was determined by the <Method for determining volume ratio $Q^1$> described above. The following theoretical values were used: $\rho^1=3.6$, $\rho^4=2.0$.

(iv) The resistivity $R^2$ of the coating section of the active material was determined by the above formula (I). The results are shown in Table 3.

With respect to the obtained positive electrode sheet, the amount α2 of the conducting agent, based on the total mass of the positive electrode active material layer, was measured by the <<Method for measuring amount of conducting agent>>. The <Method for measuring spread resistance distribution> when determining the volume ratio α1 of the conducting agent to the positive electrode active material layer was carried out under the following conditions. The results are shown in Table 3.

(Measurement Conditions for Spreading Resistance Distribution)

With respect to a cross section parallel to the thickness direction of the positive electrode active material layer as a measurement target, the spreading resistance distribution was measured under the following conditions using SSRM.

(Measuring instrument used) Product name: NanoSpeceV DivisionIcon, Glovebox, manufactured by Made by Bruker Corporation.

(Preparation of sample) A test piece cut out from the positive electrode sheet was embedded in an epoxy resin and then cut by broad ion beam processing to obtain a cross section. The resulting was introduced into the measuring instrument under an inert atmosphere.

(Measurement Conditions)

Scanning mode: Simultaneous measurement of contact mode and spreading resistance.

Probe (tip): Diamond-coated silicon cantilever (DDESS 10).

Measurement environment: Room temperature, high-purity Ar gas atmosphere ($H_2O$=0.1 ppm. $O_2$=0.1 ppm).

Applied voltage: DC bias voltage=+2.0 V.

Scan size: 60 μm×60 μm.

Number of measurement points (number of data points): 1024×1024.

In Examples B1 to B6, the resistivity $R^2$ of the coating section of the active material was higher than 0.10 Ω·cm, and the resistivity $R^1$ of the conducting agent was 0.10 Ω·cm or less. Since the positive electrode active material layers of Examples B1 to B3 did not contain a conducting agent, the amount of the low-resistance conductive carbon material (C1) was zero. The amount of the low-resistance conductive carbon material (C1) in the positive electrode active material layers of Examples B4 to B6 was the same as the amount of the conducting agent.

Table 3 shows the amount of the low-resistance conductive carbon material (C1) with respect to the total mass of the positive electrode active material layer.

(Production and Evaluation of Non-Aqueous Electrolyte Secondary Battery)

Using the positive electrode obtained in each of the Examples, a non-aqueous electrolyte secondary battery having the configuration shown in FIG. 2 was manufactured by the following method.

$LiPF_6$ as an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in each of the Examples and the negative electrode obtained in Production Example 1 were alternately interleaved through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-scaled to manufacture a non-aqueous electrolyte secondary battery (laminate cell).

The cycle capacity retention was measured by the above method to evaluate the durability. The results are shown in Table 3.

TABLE 3

| | RAW MATERIALS FOR POSITIVE ELECTRODE COMPOSITION | | | | | POWDER RESISTIVITY $R^1$ OF POSITIVE ELECTRODE ACTIVE MATERIAL LAYER | RESISTIVITY $R^2$ OF COATING SECTION OF ACTIVE MATERIAL |
|---|---|---|---|---|---|---|---|
| | POSITIVE ELECTRODE ACTIVE MATERIAL PARTICLES | | CONDUCTING AGENT | | | | |
| | TYPE | AMOUNT OF COATING SECTION OF ACTIVE MATERIAL | TYPE | RESISTIVITY $R^4$ OF CONDUCTING AGENT | BINDER AMOUNT | | |
| UNIT | — | wt % | — | Ω · cm | wt % | Ω · cm | Ω · cm |
| Ex. 1 | (1) | 1.1 | — | — | 0.5 | 34.4 | 0.417 |
| Ex. 2 | (2) | 2.2 | — | — | 0.5 | 12.4 | 0.334 |

TABLE 3-continued

| | | | | | | | |
|---|---|---|---|---|---|---|---|
| Ex. 3 | (3) | 1.1 | — | — | 0.5 | 25.5 | 0.315 |
| Ex. 4 | (1) | 1.1 | AB | 0.016 | 0.5 | 33.0 | 0.417 |
| Ex. 5 | (1) | 1.1 | AB | 0.016 | 1.5 | 2.8 | 0.417 |
| Ex. 6 | (1) | 1.1 | CNT | 0.005 | 1.5 | 2.5 | 0.417 |

| | RATIO TO POSITIVE ELECTRODE ACTIVE MATERIAL LAYER | | | | |
|---|---|---|---|---|---|
| UNIT | AMOUNT $m^1$ OF COATING SECTION OF ACTIVE MATERIAL wt % | VOLUME RATIO $\alpha 1$ OF CONDUCTING AGENT vol % | AMOUNT $\alpha 2$ OF CONDUCTING AGENT wt % | AMOUNT OF LOW-RESISTANCE CONDUCTIVE CARBON MATERIAL (C1) wt % | RAPID CHARGE/ DISCHARGE CYCLE CAPACITY RETENTION % |
| Ex. 1 | 1.1 | — | — | 0 | 55 |
| Ex. 2 | 2.2 | — | — | 0 | 63 |
| Ex. 3 | 1.1 | — | — | 0 | 57 |
| Ex. 4 | 1.1 | 1.0 | 0.3 | 0.3 | 52 |
| Ex. 5 | 1.0 | 15.7 | 5.4 | 5.4 | 16 |
| Ex. 6 | 1.1 | 7.5 | 2.0 | 2.0 | 25 |

As can be understood from the results shown in Table 3, in Examples B1 to B4 where the amount of the low-resistance conductive carbon material (C1) having a resistivity of 0.10 $\Omega \cdot cm$ or less was 0.5% by mass or less, based on the total mass of the positive electrode active material layer, the capacity retention in the rapid charge/discharge cycle test was high, indicating excellent durability.

In Examples B1 to B4, the amount of the low-resistance conductive carbon material (C2) having a resistivity of 0.02 $\Omega \cdot cm$ or less was also 0.5% by mass or less.

On the other hand, in Examples B5 and B6 in which the low-resistance conductive carbon material (C1) exceeded 0.5% by mass, based on the total mass of the positive electrode active material layer, the capacity retention in the rapid charge/discharge cycle test was low, indicating inferior durability.

Presumably, in Examples B5 and B6, the current concentrated on the conductive carbon material having a low resistivity during the rapid charge/discharge cycles, which triggered side reactions between the positive electrode and the electrolytic solution, and facilitated the decomposition of the electrolytic solution. When the resistance component increases due to the decomposition of the electrolytic solution and the reactions between the resulting decomposition products and the electrode, the deterioration of the battery due to the rapid charge/discharge is facilitated.

In Examples B1 to B4, the amount of the conductive carbon material having a low resistivity was suppressed to a low level, which presumably suppressed the progress of decomposition of the electrolytic solution, and improved the cycling performance.

In particular, in Example B2 in which the amount of the coated section of the active material was large with respect to the total mass of the positive electrode active material particles, the powder resistivity of the positive electrode active material layer was low among Examples B1 to B4, and the rapid charge/discharge cycle capacity retention was further improved.

<Measuring Method>
(Method for Measuring Powder Resistivity)

The powder resistivity was measured by the following method with respect to a dried product, as a measurement target, obtained by scraping off the positive electrode active material layer 12 from the positive electrode current collector 11 with a spatula, etc., to obtain a sample, and vacuum-drying the obtained sample at 120° C. for 4 hours.

The measurement was implemented using a powder resistance measuring system (model number: MCP-PD51) manufactured by Nittoseiko Analytech, Co., Ltd. The mass of the sample after vacuum drying was measured in advance, whereafter the sample was placed in a measuring cell with a radius of 10 mm, and the powder resistivity (unit: $\Omega \cdot cm$) and the sample thickness under the application of a pressure of 16 kN were measured. The powder density (g/cm$^3$) at the time of measurement was determined from the mass and thickness values of the sample. It was confirmed that the powder density was in the range of 2.0 to 2.4 (g/cm$^3$), and the influence of the difference in powder density on the measurement results was negligibly small.

The pressure applied was 16 kN in all of the present Examples, but is not limited to this value. There is not particular limitation with respect to the range of the powder density at the time of measurement because the powder density is affected by the amounts of the positive electrode active material, the conducting agent, and the binder contained in the positive electrode active material layer 12. For avoiding the influence of measurement variation, it is desirable that the powder density at the time of measurement is in the range of 2.0 to 2.4 g/cm$^3$.

(Measurement Method for Mass Per Unit Area of Positive Electrode Active Material Layer (or Negative Electrode Active Material))

5 sheets of measurement samples were prepared by punching the positive electrode sheet (or the negative electrode sheet) into circles with a diameter of 16 mm.

Each measurement sample was weighed with a precision balance, and the mass of the positive electrode active material layer (or the negative electrode active material layer) in the measurement sample was calculated by subtracting the mass of the positive electrode current collector 11 (or the negative electrode current collector 31) measured in advance from the measurement result.

From the ratio: mass of positive electrode active material layer (unit: mg)/area of measurement sample (unit: cm$^2$), the mass the positive electrode active material layer per unit area (unit: mg/cm$^2$) was determined.

From the ratio: mass of negative electrode active material layer (unit: mg)/area of measurement sample (unit: cm$^2$), the mass the negative electrode active material layer per unit area (unit: mg/cm²) was determined.

<Evaluation Method>

(Measurement Method for Peel Strength)

Figure 6:
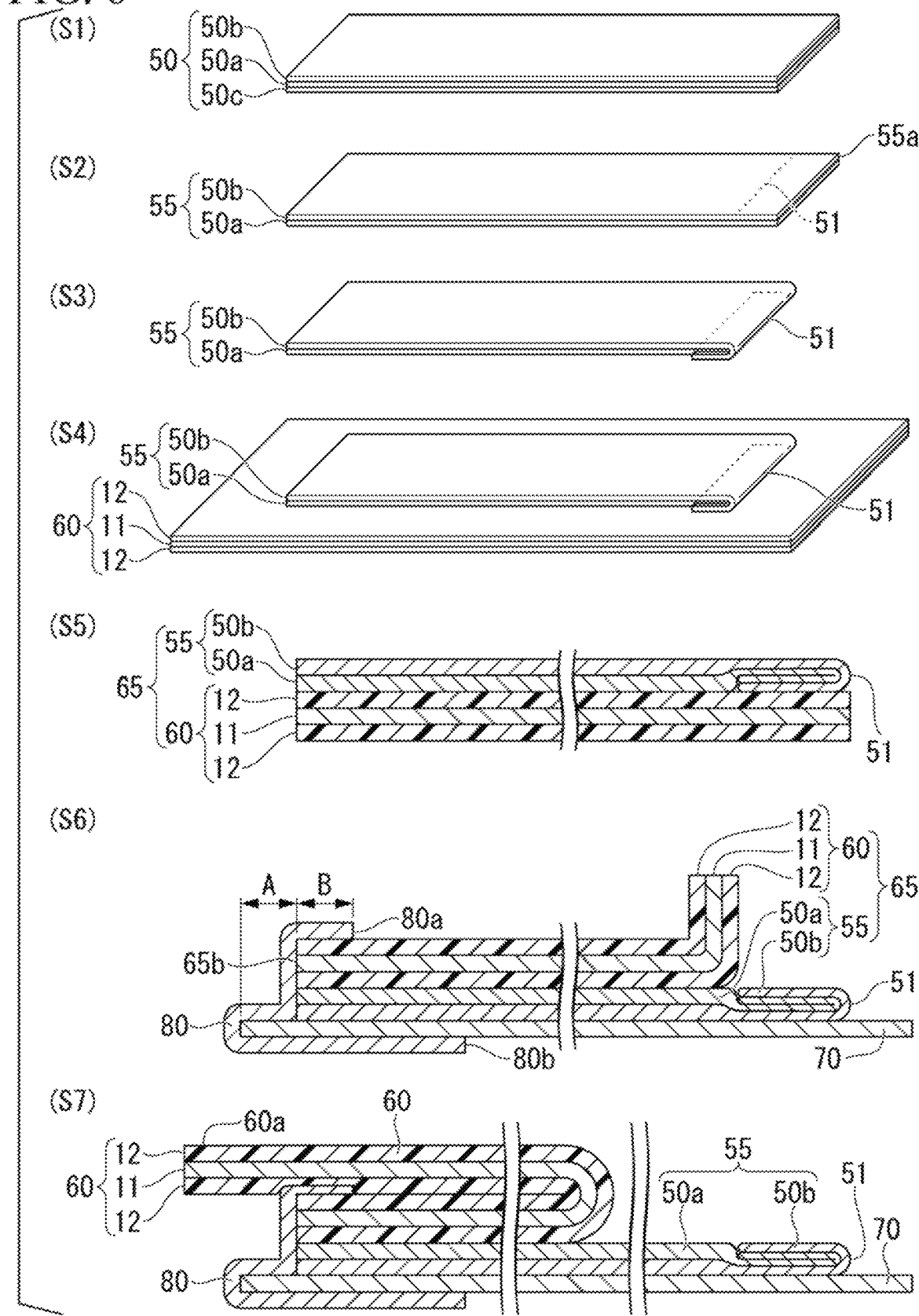
FIG. 6 is a process diagram for explaining a method for measuring the peel strength of a positive electrode active material layer.

The peel strength of the positive electrode active material layer 12 can be measured by the following method using a tensile tester. FIG. 6 is a process diagram showing a method for measuring the peel strength of the positive electrode active material layer. The steps (S1) to (S7) shown in FIG. 6 are respectively described below. FIG. 6 is a schematic diagram for facilitating the understanding of the configuration, and the dimensional ratios and the like of each component do not necessarily represent the actual ones.

(S1) First, a rectangular double-sided tape 50 having a width of 25 mm and a length of 120 mm is prepared. In the double-sided tape 50, release papers 50b and 50c are laminated on both sides of the adhesive layer 50a. As the double-sided tape 50, a product manufactured and sold by Nitto Denko Corporation with a product name "No. 5015, 25 mm width" is used.

(S2) The release paper 50c on one side of the double-sided tape 50 is peeled off to obtain an adhesive body 55 with the surface of the adhesive layer 50a (hereinafter, also referred to as "glue surface") being exposed. In the adhesive body 55, a bending position 51 is provided at a distance of about 10 mm from one end 55a in the longitudinal direction of the adhesive body 55.

(S3) The adhesive body 55 is bent at a position on the one end 55a side as viewed from the bending position 51 such that the glue surfaces adhere to each other.

(S4) The adhesive body 55 and the positive electrode sheet 60 are bonded together such that the glue surface of the adhesive body 55 and the positive electrode active material layer 12 of the positive electrode sheet 60 are in contact with each other.

(S5) The positive electrode sheet 60 is cut out along the outer edge of the adhesive body 55, and the adhesive body 55 and the positive electrode sheet 60 are crimped to obtain a composite 65 by a method of reciprocating a crimping roller twice in the longitudinal direction.

(S6) The outer surface of the composite 65 on the adhesive body 55 side is brought into contact with one surface of a stainless plate 70, and the other end 65b on the side opposite to the bending position 51 is fixed to the stainless plate 70 with a mending tape 80. As the mending tape 80, a product manufactured and sold by 3M Company with a product name "Scotch Tape Mending Tape 18 mm×30 Small Rolls 810-1-18D" is used. The length of the mending tape 80 is about 30 mm, the distance A from an end of the stainless plate 70 to the other end 65b of the composite 65 is about 5 mm, and the distance B from one end 80a of the mending tape 80 to the other end 65b of the composite 65 is 5 mm. The other end 80b of the mending tape 80 is attached to the other surface of the stainless plate 70.

(S7) At the end of the composite 65 on the bending position 51 side, the positive electrode sheet 60 is slowly peeled off from the adhesive 55 in parallel with the longitudinal direction. The end (hereinafter, referred to as "peeling end") 60a of the positive electrode sheet 60 that is not fixed by the mending tape 80 is slowly peeled off until it protrudes from the stainless steel plate 70.

Next, the stainless plate 70 to which the composite 65 is fixed is installed on a tensile tester (product name "EZ-LX", manufactured by Shimadzu Corporation) (not shown), the end of the adhesive 55 on the bending position 51 side is fixed, and the peeling end 60a of the positive electrode sheet 60 is pulled in the direction opposite to the bending position 51 (180° direction with respect to the bending position 51) at a test speed of 60 mm/min. a test force of 50,000 mN, and a stroke of 70 mm to measure the peel strength. The average value of the peel strength at a stroke of 20 to 50 mm is taken as the peel strength of the positive electrode active material layer 12.

(Measurement Method for Gravimetric Energy Density)

The evaluation of the gravimetric energy density was performed according to the following procedures (1) to (3).
(1) A cell was prepared so as to have a rated capacity of 1 Ah, and the weight of the cell was measured.
(2) In an environment of 25° C., the obtained cell was charged at a constant current rate of 0.2 C (that is, 200 mA) and with a cut-off voltage of 3.6 V, 6 V, and then charged at a constant voltage with a cut-off current set at 1/10 of the above-mentioned charge current (that is, 20 mA). Then, a 30-minute pause was provided while leaving the cell in the open circuit state.
(3) The cell was discharged at a constant current rate of 0.2 C and with a cut-off voltage of 2.5 V. In this process, the gravimetric energy density (Wh/kg) was calculated by dividing the total discharge power (Wh) measured from the start of discharge to the end of discharge by the mass (kg) of the cell measured in (1).

(Measurement Method for Impedance)

A cell was prepared so as to have a rated capacity of 1 Ah, and the obtained cell was charged at a constant current rate of 0.2 C (that is, 200 mA) and with a cut-off voltage of 3.6 V. Then, the cell was charged at a constant voltage with a cut-off current set at 1/10 of the above-mentioned charge current (that is, 20 mA), followed by measurement of impedance under the conditions of room temperature (25° C.) and frequency of 0.1 kHz.

The measurement was carried out by 4-terminal method in which a current terminal and a voltage terminal are attached to the positive and negative electrode tabs, respectively. As an example, an impedance analyzer manufactured by BioLogic was used for the measurement.

Examples C1 to C8

Examples C1 to C5 are implementation of the present invention, while Examples C6 to C8 are comparative examples.

A carbon-coated lithium iron phosphate (hereinbelow, also referred to as "carbon-coated active material") with an average particle size of 1.0 μm and a carbon content of 1% by mass was used as a positive electrode active material.

Carbon black was used as a conducting agent.

Polyvinylidene fluoride (PVDF) was used as a binder.

Example C1

First, a positive electrode current collector 11 was prepared by coating both the front and back surfaces of a positive electrode current collector main body 14 with current collector coating layers 15 by the following method. An aluminum foil (thickness 15 μm) was used as the positive electrode current collector main body 14.

A slurry was obtained by mixing 100 parts by mass of carbon black, 40 parts by mass of polyvinylidene fluoride as a binder, and N-methylpyrrolidone (NMP) as a solvent. The amount of NMP used was the amount required for applying the slurry.

The obtained slurry was applied to both sides of the positive electrode current collector main body 14 by a gravure method so as to allow the resulting current collector coating layers 15 after drying (total of layers on both sides) to have a thickness of 2 μm, and dried to remove the solvent, thereby obtaining a positive electrode current collector 11. The current collector coating layers 15 on both surfaces were formed so as to have the same amount of coating and the same thickness.

Next, a positive electrode active material layer 12 was formed by the following method.

With the blending ratio shown in Table 4, the positive electrode active material, the conducting agent, the binder, and the solvent (NMP) were mixed with a mixer to obtain a positive electrode composition. The amount of the solvent used was the amount required for applying the positive electrode composition.

The positive electrode composition was applied on both sides of the positive electrode current collector 11, and after pre-drying, the applied composition was vacuum-dried at 120° C. to form positive electrode active material layers 12. The amount of the applied positive electrode composition is shown in Table 5 (the same applies to the other examples). The resulting laminate was pressure-pressed with a load of 10 kN to obtain a positive electrode sheet. The positive electrode active material layers 12 on both surfaces of the positive electrode current collector 11 were formed so as to have the same coating amount and the same thickness.

Using the obtained positive electrode sheet as a sample, the powder resistivity, the binder content, the mass per unit area of the positive electrode active material layer, and the peel strength were measured.

The conductive carbon content with respect to the total mass of the positive electrode active material layer was calculated based on the carbon content and blending amount of the carbon-coated active material as well as the carbon content and blending amount of the conducting agent. The conducting agent was regarded as having an impurity content of less than the quantification limit and a carbon content of 100% by mass. The conductive carbon content with respect to the total mass of the positive electrode active material layer can also be confirmed by using the method described in the <<Method for measuring conductive carbon content>> described above. The results are shown in Table 5 (the same applies to the other examples). The obtained positive electrode sheet was punched to obtain a positive electrode.

A non-aqueous electrolyte secondary battery having a configuration shown in FIG. 2 was manufactured by the following method.

$LiPF_6$ an electrolyte was dissolved at 1 mol/L in a solvent in which ethylene carbonate (EC) and diethyl carbonate (DEC) were mixed at a volume ratio, EC:DEC, of 3:7, to thereby prepare a non-aqueous electrolytic solution.

The positive electrode obtained in this example and the negative electrode obtained in Production Example 1 were alternately interleaved through a separator to prepare an electrode layered body with its outermost layer being the negative electrode. A polyolefin film (thickness 15 μm) was used as the separator.

In the step of producing the electrode layered body, the separator 2 and the positive electrode 1 were first stacked, and then the negative electrode 3 was stacked on the separator 2.

Terminal tabs were electrically connected to the exposed section 13 of the positive electrode current collector and the exposed section 33 of the negative electrode current collector in the electrode layered body, and the electrode layered body was put between aluminum laminate films while allowing the terminal tabs to protrude to the outside. Then, the resulting was laminate-processed and sealed at three sides.

To the resulting structure, a non-aqueous electrolytic solution was injected from one side left unsealed, and this one side was vacuum-sealed to manufacture a non-aqueous electrolyte secondary battery (laminate cell).

The gravimetric energy density and impedance were measured by the above methods. The results are shown in Table 5 (the same applies to the other examples).

Example C2

The coating amount of the positive electrode composition was changed from that in Example C1 so as to give a mass per unit area of the positive electrode active material layer shown in Table 5. Except this point, a positive electrode was prepared in the same manner as in Example C1.

The negative electrode used was one produced in the same manner as in Production Example 1 except the coating amount of the negative electrode composition was changed so as to give a mass per unit area of the negative electrode active material layer shown in Table 5. Otherwise, a secondary battery was manufactured and evaluated in the same manner as in Example C1.

Example C3

The blending ratio for the positive electrode composition was changed from that in Example C2 to that shown in Table 4. Otherwise, a positive electrode was produced in the same manner as in Example C2, and a secondary battery was manufactured and evaluated in the same manner as in Example C2.

Example C4

The coating amount of the positive electrode composition was changed from that in Example C3 so as to give a mass per unit area of the positive electrode active material layer shown in Table 5. Except this point, a positive electrode was prepared in the same manner as in Example C3.

The negative electrode used was one produced in the same manner as in Production Example 1 except the coating amount of the negative electrode composition was changed so as to give a mass per unit area of the negative electrode active material layer shown in Table 5. Otherwise, a secondary battery was manufactured and evaluated in the same manner as in Example C3.

Example C5

The blending ratio for the positive electrode composition was changed from that in Example C1 to that shown in Table 4. The coating amount of the positive electrode composition was changed from that in Example C1 so as to give a mass per unit area of the positive electrode active material layer shown in Table 5. The negative electrode used was one produced in the same manner as in Production Example 1 except the coating amount of the negative electrode composition was changed so as to give a mass per unit area of the negative electrode active material layer shown in Table 5. Otherwise, a positive electrode was produced in the same manner as in Example C1, and a secondary battery was manufactured and evaluated in the same manner as in Example C1.

Examples C6, C7

The blending ratio for the positive electrode composition was changed from that in Example C1 to that shown in Table 4. Otherwise, a positive electrode was produced in the same manner as in Example C1, and a secondary battery was manufactured and evaluated in the same manner as in Example C1.

Example C8

The blending ratio for the positive electrode composition was changed from that in Example C2 to that shown in Table 4. Otherwise, a positive electrode was produced in the same manner as in Example C2, and a secondary battery was manufactured and evaluated in the same manner as in Example C2.

TABLE 4

| | BLENDING RATIO FOR POSITIVE ELECTRODE COMPOSITION (PARTS BY MASS) | | | |
|---|---|---|---|---|
| | POSITIVE ELECTRODE ACTIVE MATERIAL | CONDUCTING AGENT | BINDER | SOLVENT |
| Ex. 1 | 99.2 | 0.5 | 0.3 | REQUIRED AMOUNT |
| Ex. 2 | 99.2 | 0.5 | 0.3 | |
| Ex. 3 | 90.0 | 0.5 | 0.5 | |
| Ex. 4 | 90.0 | 0.5 | 0.5 | |
| Ex. 5 | 99.5 | — | 0.5 | |
| Ex. 6 | 93.5 | 5.0 | 1.5 | |
| Ex. 7 | 94.5 | 5.0 | 0.5 | |
| Ex. 8 | 93.5 | 5.0 | 1.5 | | rial layer was high, the impedance of the non-aqueous electrolyte secondary battery decreased and the gravimetric energy density increased.

In Example C2, as a result of increasing the coating amount of the positive electrode composition as compared to Example C1, the gravimetric energy density improved further while ensuring good peel strength.

Example C3 used a slightly larger amount of the binder than Example C2, and the peel strength improved. The increase in powder resistivity and impedance due to the increase in the amount of binder was small, and good performance was achieved.

In Example C4, as a result of increasing the coating amount of the positive electrode composition as compared to Example C3, the gravimetric energy density further increased while ensuring good peel strength.

In Example C5, no conducting agent was used, but the increase in powder resistivity and impedance was small, and good performance was achieved. The gravimetric energy density was the highest while ensuring good peel strength.

Example C6 used larger amounts of the conducting agent and the binder than Example C1, and the powder resistivity of the positive electrode active material layer was low. The peel strength was at the same level as in Example C1, but the impedance of the non-aqueous electrolyte secondary battery was high and the gravimetric energy density was low.

Example C7 was inferior in peel strength as a result of reducing the amount of the binder as compared to Example C6.

Example C8 is an example in which the coating amount of the positive electrode composition was increased as compared to Example C6. The mass per unit area of the positive electrode active material layer was the same as in Example C2, but the amounts of the conducting agent and the binder were larger than those of Example C2, and the

TABLE 5

| | POSITIVE ELECTRODE ACTIVE MATERIAL LAYER | | | | | | | |
|---|---|---|---|---|---|---|---|---|
| UNIT | POWDER RESIS-TIVITY $\Omega \cdot cm$ | BINDER CONTENT wt % | CONDUC-TIVE CARBON CONTENT wt % | PEEL STRENGTH mN/cm | MASS PER UNIT AREA OF POSITIVE ELECTRODE ACTIVE MATERIAL LAYER (TOTAL FOR BOTH SURFACES) $mg/cm^2$ | MASS PER UNIT AREA OF NEGATIVE ELECTRODE ACTIVE MATERIAL LAYER FOR BOTH SURFACES) $mg/cm^2$ | GRAVIMETRIC ENERGY DENSITY Wh/kg | IMPEDANCE (0.1 kHz) $m\Omega$ |
| Ex. 1 | 23 | 0.3 | 1.5 | 61.3 | 30 | 14 | 125 | 12 |
| Ex. 2 | 25 | 0.3 | 1.5 | 39.3 | 43 | 20 | 141 | 13 |
| Ex. 3 | 34 | 0.5 | 1.5 | 64.2 | 43 | 20 | 141 | 17 |
| Ex. 4 | 33 | 0.5 | 1.5 | 31.7 | 50 | 23 | 145 | 18 |
| Ex. 5 | 48 | 0.5 | 1.0 | 45.5 | 48 | 22 | 148 | 17 |
| Ex. 6 | 4 | 1.5 | 6.0 | 59.8 | 30 | 13 | 119 | 31 |
| Ex. 7 | 3 | 0.5 | 6.0 | 7.8 | 30 | 13 | 121 | 11 |
| Ex. 8 | 4 | 1.5 | 6.0 | 67.9 | 43 | 19 | 127 | 33 |

As can be understood from the results shown Table 5, in Examples C1 to C5 in which the powder resistivity of the positive electrode active material layer was 10 to 1,000 $\Omega \cdot cm$, the peel strength of the positive electrode active material layer was good, and the non-aqueous electrolyte secondary battery had low impedance and high gravimetric energy density.

Example C1 is an example in which the amount of the binder was reduced to the extent that sufficient peel strength could be achieved. Compared with Example C5, although the powder resistivity of the positive electrode active mate-powder resistivity of the positive electrode active material layer was low. The impedance of the non-aqueous electrolyte secondary battery was higher and the gravimetric energy density was lower than those of Example C2.

REFERENCE SIGNS LIST

1 Positive electrode
2 Separator
3 Negative electrode
5 Outer casing
10 Secondary battery
11 Positive electrode current collector 12 Positive electrode active material layer
13 Exposed section of positive electrode current collector
14 Positive electrode current collector main body
15 Current collector coating layer
31 Negative electrode current collector
32 Negative electrode active material layer
33 Exposed section of negative electrode current collector
50 Double-sided tape
50a Adhesive layer
50b Release paper
51 Bending position
55 Adhesive body
60 Positive electrode sheet
70 Stainless steel plate
80 Mending tape

The invention claimed is:

1. A positive electrode for a non-aqueous electrolyte secondary battery, comprising a current collector and a positive electrode active material layer which includes positive electrode active material particles and is provided on the current collector, wherein:
the positive electrode active material layer has a thickness of 30 to 500 μm, and
a spreading resistance distribution of the positive electrode active material layer shows a profile with a sum of frequencies of resistance values in a range of 4.0 to 6.0 (log Ω) accounting for 0.0 to 5.0%, relative to a total, 100%, of frequencies of resistance values in a range of 4.0 to 12.5 (log Ω).

2. The positive electrode according to claim 1, wherein an average frequency of the resistance values in a range of 6.0 to 9.0 (log Ω) is larger than an average frequency of the resistance values in a range of 4.0 to 6.0 (log Ω) in the spreading resistance distribution.

3. The positive electrode according to claim 1, wherein the positive electrode active material layer comprises a conducting agent.

4. The positive electrode according to claim 3, wherein the positive electrode active material has, on at least a part of its surface, a coated section comprising a conductive material.

5. The positive electrode according to claim 3, wherein the positive electrode active material layer comprises a conductive carbon, and an amount of the conductive carbon is 0.5% by mass or more and less than 3.0% by mass, based on a total mass of the positive electrode active material layer.

6. The positive electrode according to claim 1, wherein the positive electrode active material layer does not contain a conducting agent, and the positive electrode active material particles have, on at least a part of surfaces thereof, a coated section comprising a conductive material.

7. The positive electrode active material according to claim 1, wherein the positive electrode active material comprises a compound represented by a formula $LiFe_x M_{(1-x)}PO_4$, wherein $0 \leq x \leq 1$, M is Co, Ni, Mn, Al, Ti or Zr.

8. The positive electrode according to claim 1, wherein a current collector coating layer comprising a conductive material is present on at least a part of a surface of the positive electrode current collector on a side of the positive electrode active material layer.

9. A non-aqueous electrolyte secondary battery, comprising the positive electrode of claim 1, a negative electrode, and a non-aqueous electrolyte disposed between the positive electrode and the negative electrode.

10. The positive electrode according to claim 1, wherein the current collector comprises a main body formed of a conductive metal selected from the group consisting of copper, aluminum, titanium, nickel, and stainless steel.

11. A battery module or battery system comprising a plurality of the non-aqueous electrolyte secondary batteries of claim 9.

* * * * *